(12) United States Patent
Matsumoto et al.

(10) Patent No.: US 7,526,832 B2
(45) Date of Patent: May 5, 2009

(54) WIPER BLADE HAVING A LEVER CONNECTED TO WIPER ARM

(75) Inventors: Hiroshi Matsumoto, Hamamatsu (JP);
Masaaki Kiyama, Hamamatsu (JP);
Toshiharu Aoyama, Toyohashi (JP);
Hiroyuki Nakano, Kosai (JP)

(73) Assignee: ASMO Co., Ltd., Shizuoka-pref. (JP)

( * ) Notice: Subject to any disclaimer, the term of this patent is extended or adjusted under 35 U.S.C. 154(b) by 772 days.

(21) Appl. No.: 10/859,084

(22) Filed: Jun. 3, 2004

(65) Prior Publication Data
US 2004/0250369 A1    Dec. 16, 2004

(30) Foreign Application Priority Data
Jun. 13, 2003    (JP)    ............... 2003-170023
Feb. 3, 2004     (JP)    ............... 2004-027259

(51) Int. Cl.
*B60S 1/38*    (2006.01)
*B60S 1/40*    (2006.01)

(52) U.S. Cl. ............... 15/250.201; 15/250.43; 15/250.32

(58) Field of Classification Search ............. 15/250.43, 15/250.44, 250.32, 250.201, 250.361
See application file for complete search history.

(56) References Cited

U.S. PATENT DOCUMENTS

| | | | |
|---|---|---|---|
| 3,969,784 A | | 7/1976 | Journée |
| 3,978,543 A | * | 9/1976 | Tomlin ............... 15/250.44 |
| 4,336,625 A | * | 6/1982 | Maiocco ............... 15/250.451 |
| 4,807,326 A | * | 2/1989 | Arai et al. ............... 15/250.43 |
| 6,161,248 A | * | 12/2000 | Merkel et al. ............... 15/250.32 |
| 6,295,690 B1 | | 10/2001 | Merkel et al. |
| 7,373,688 B2 | * | 5/2008 | Aoyama et al. ............... 15/250.201 |

FOREIGN PATENT DOCUMENTS

| | | | |
|---|---|---|---|
| DE | 3339414 | * | 5/1985 |
| DE | 10036122 | * | 4/2002 |
| DE | 10057253 | * | 5/2002 |
| EP | 0 791 514 A2 | | 8/1997 |
| GB | 678198 | | 8/1952 |
| GB | 1386560 | | 3/1975 |
| JP | A-49-92726 | | 9/1974 |
| JP | A-59-029547 | | 2/1984 |

(Continued)

OTHER PUBLICATIONS

Search Report from French Patent Office issued on May 10, 2006 for the corresponding French patent application No. FR 0406383 (a copy thereof).
Office Action dated Jun. 19, 2008 in corresponding Japanese Patent Application No. 2004-027259 (and English translation).

*Primary Examiner*—Gary K Graham
(74) *Attorney, Agent, or Firm*—Posz Law Group, PLC

(57) ABSTRACT

A connecting arrangement of a lever is rotatably connected to a wiper arm. Arms of the lever are located on longitudinal sides, respectively, of the connecting arrangement and extend in the longitudinal direction of a wiper strip. Each arm of the lever includes a holding portion, which is provided in a longitudinal distal end of the arm to hold the wiper strip together with backing plates. The holding portion of each arm of the lever is positioned in an intermediate location between the connecting arrangement and a corresponding longitudinal end of the wiper strip.

16 Claims, 15 Drawing Sheets

FOREIGN PATENT DOCUMENTS

| | | |
|---|---|---|
| JP | A-63-145155 | 6/1988 |
| JP | U-7-28759 | 5/1995 |
| JP | A-2002-370622 | 12/2002 |
| WO | 84/00523 * | 2/1984 |
| WO | WO 00/21810 | 4/2000 |
| WO | 01/92073 * | 6/2001 |

* cited by examiner

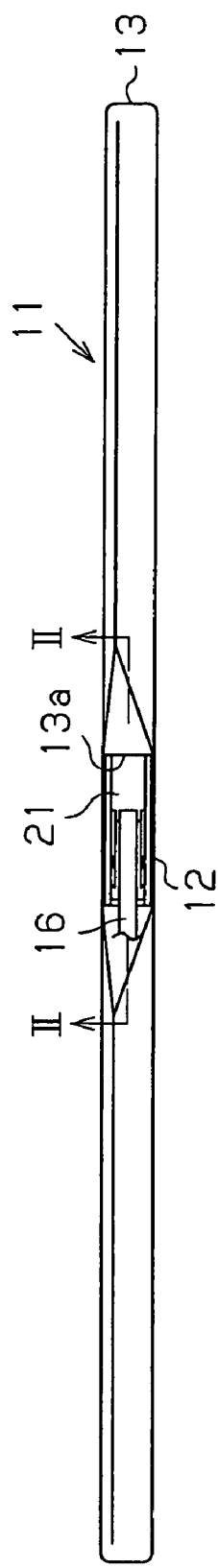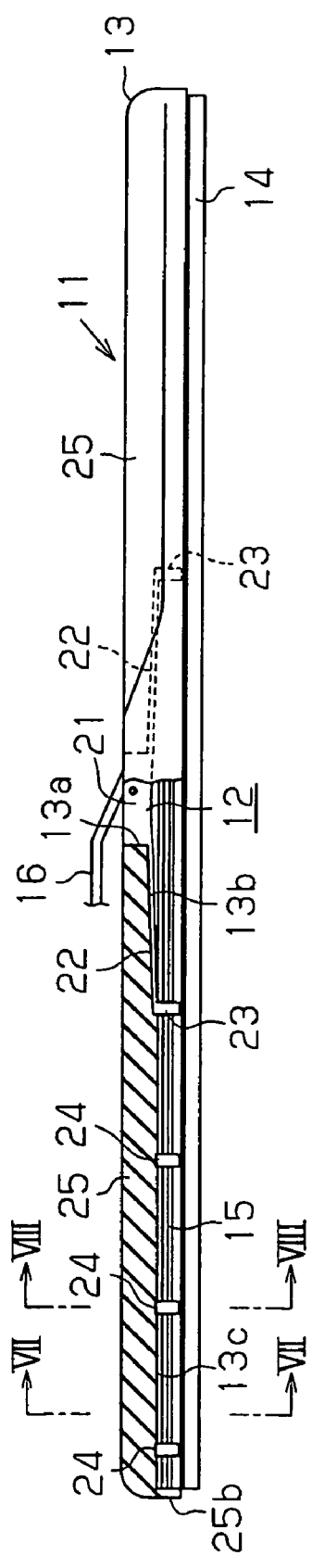

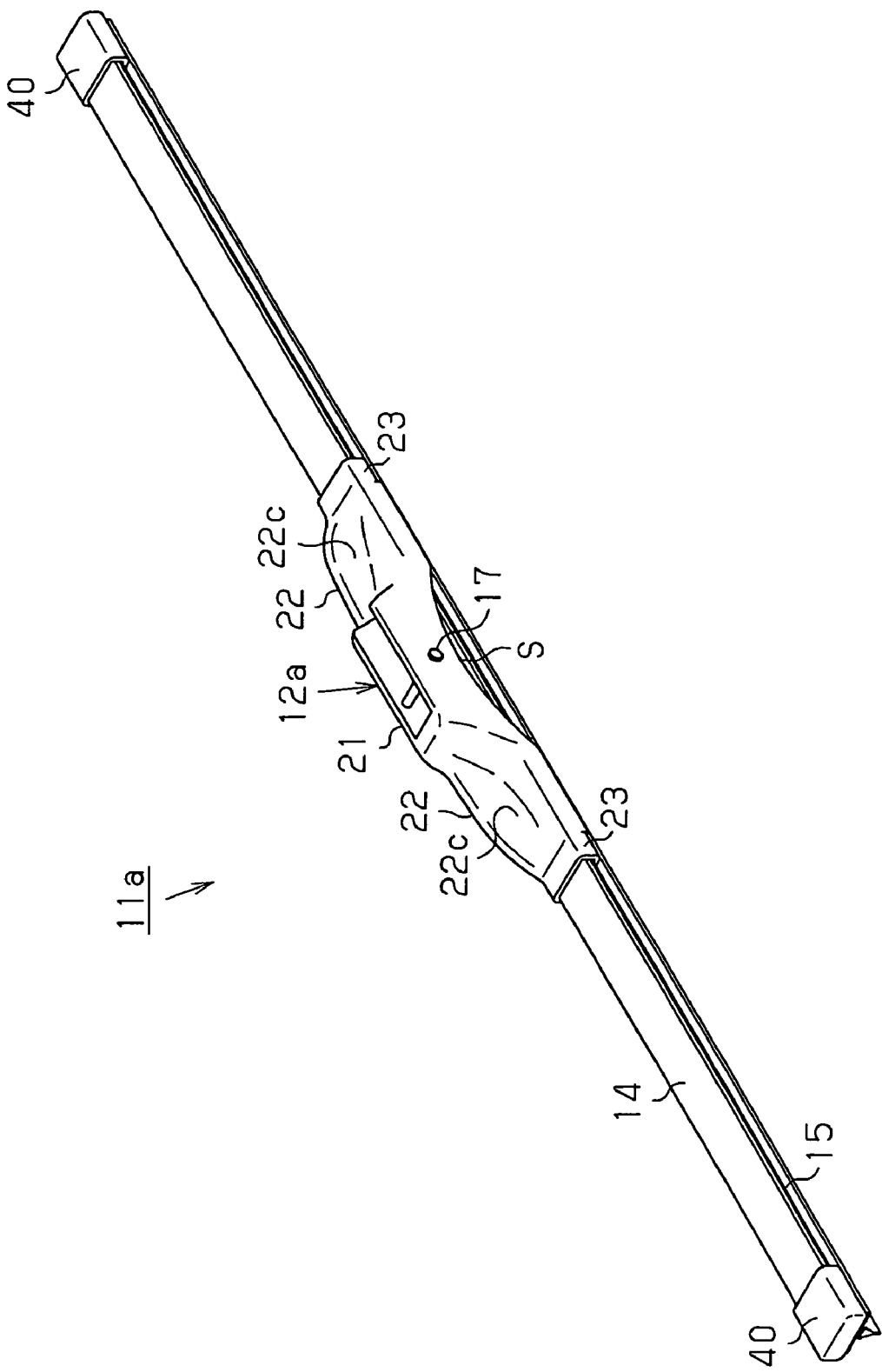

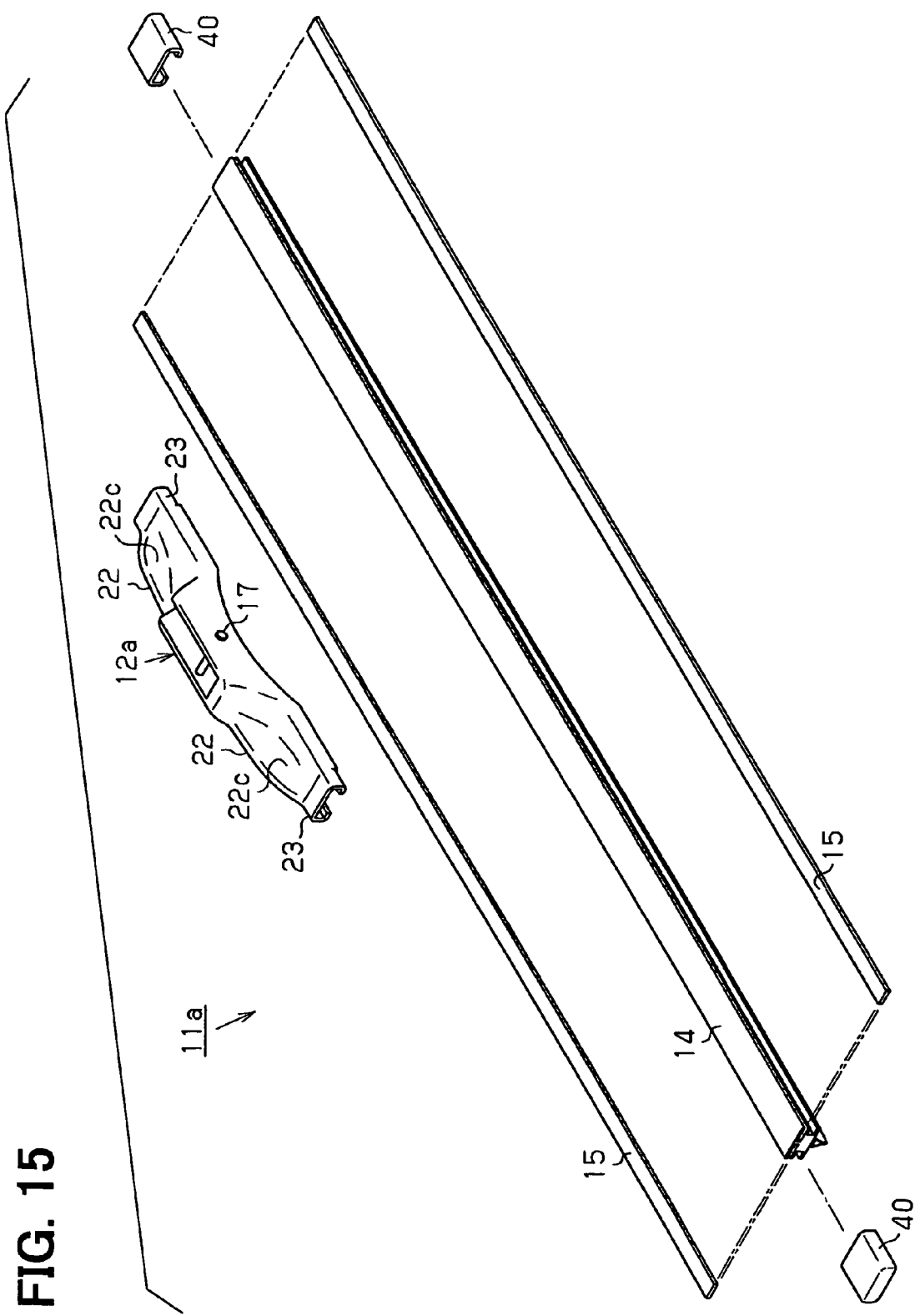

WIPER BLADE HAVING A LEVER CONNECTED TO WIPER ARM

CROSS REFERENCE TO RELATED APPLICATION

This application is based on and incorporates herein by reference Japanese Patent Application No. 2003-170023 filed on Jun. 13, 2003 and Japanese Patent Application No. 2004-27259 filed on Feb. 3, 2004.

BACKGROUND OF THE INVENTION

1. Field of the Invention

The present invention relates to a wiper blade, which wipes a wiping surface, such as a windshield surface of a vehicle.

2. Description of Related Art

A tournament wiper blade is well known. The tournament wiper blade has a lever assembly, which includes a plurality of levers that are rotatably connected together. Since the levers are connected in a tournament fashion, the height of the wiper blade becomes relatively high. Therefore, upon receiving wind, which is applied to a running vehicle, the tournament wiper blade tends to increase resistance and wind noise or even blocks a driver's view in some cases.

To address the above disadvantages, Japanese Unexamined patent Publication No. 2001-504779 discloses a lever-less wiper blade. In the lever-less wiper blade, backing plates, each of which is shaped into a predetermined curved shape and serves as a spring member, are fitted to backing grooves of a wiper strip. A holder, to which a wiper arm is connected, is directly secured to the backing plates. In this way, the levers are eliminated in the lever-less wiper blade. In the lever-less wiper blade, urging force, which is received from the wiper arm to urge the wiper blade against a wiping surface, is applied directly to the backing plates. When the wiper blade wipes the wiping surface, the wiper strip is flexed to conform to the curvature of the wiping surface due to the spring characteristics of the backing plates.

In the above-described Japanese Unexamined patent Publication No. 2001-504779, the urging force of the wiper arm is spread along the length of the wiper strip through the backing plates. However, the urging force is applied to the backing plates through the holder secured to the longitudinal center of the wiper blade. Thus, excessive force is concentrated in the holder, so that the urging force is unequally distributed along the length of the wiper strip. The unequal distribution of the urging force causes generation of a water streak on the wiping surface (phenomenon known as "wiper streaking") at the time of wiping, for example, rain droplets on the wiping surface.

Japanese Unexamined Patent Publication No. 49-92726 discloses a wiper blade, in which a wiper strip is supported through an elongated single lever that is connected to a wiper arm. In this wiper blade, a backing plate, which serves as a spring member and is curved to a predetermined shape, is fitted to the wiper strip to conform to the curvature or contour of the wiping surface.

The single lever is made of thermoplastic resin and is elongated along the entire length of the wiper strip. Also, the single lever receives the wiper strip in a rail-like continuous groove, which extends along the entire length of the single lever. Notches are provided along the length of the single lever to facilitate flexing of the single lever. However, since the single lever holds the wiper strip along the entire length of the wiper strip, the single lever prevents the wiper strip from properly conforming to the curvature of the wiping surface at the time of wiping the wiping surface. If the rigidity of the single lever is reduced to allow the wiper strip to properly conform to the curvature of the wiping surface, the single lever cannot properly spread the urging force of the wiper arm along the length of the wiper strip. Therefore, similar to Japanese Unexamined patent Publication No. 2001-504779, the wiper blade leaves a water streak on the wiping surface at the time of wiping the wiping surface, resulting in improper wiping performance.

SUMMARY OF THE INVENTION

The present invention addresses the above disadvantages. Thus, it is an objective of the present invention to provide a wiper blade, which can minimize a height of the wiper blade and can effectively conform to a wiping surface to achieve effective wiping performance.

To achieve the objective of the present invention, there is provided a wiper blade for a wiper system that wipes a wiping surface. The wiper blade includes a wiper strip, at least one backing plate and a lever. The wiper strip directly wipes the wiping surface. The wiper strip includes at least one backing groove that extends in a longitudinal direction of the wiper strip. The at least one backing plate is made of a spring material having a predetermined rigidity and is received in a corresponding one of the at least one backing groove. Each of the at least one backing plate is convexly curved in a relaxed state in such a manner that a longitudinal center of the backing plate projects in a direction away from the wiping surface. The lever includes a connecting arrangement and first and second arms. The connecting arrangement is rotatably connected to a wiper arm of the wiper system. The first and second arms are located on first and second longitudinal sides, respectively, of the connecting arrangement. The first and second arms extend from the connecting arrangement toward first and second longitudinal ends, respectively, of the wiper strip in the longitudinal direction of the wiper strip. Each of the first and second arms includes a holding portion, which is provided in a longitudinal distal end of the arm to hold at least one of the wiper strip and the at least one backing plate. The holding portion of the first arm is positioned in an intermediate location between the connecting arrangement and the first longitudinal end of the wiper strip. The holding portion of the second arm is positioned in an intermediate location between the connecting arrangement and the second longitudinal end of the wiper strip.

BRIEF DESCRIPTION OF THE DRAWINGS

The invention, together with additional objectives, features and advantages thereof, will be best understood from the following description, the appended claims and the accompanying drawings in which:

FIG. 1A is a plan view of a wiper blade according to an embodiment of the present invention;

FIG. 1B is a partially fragmented front view of the wiper blade shown in FIG. 1A;

FIG. 14 is a perspective view showing a further modification of the wiper blade;

FIG. 15 is an exploded perspective view of the wiper blade shown in FIG. 14;

DETAILED DESCRIPTION OF THE INVENTION

Figure 2:
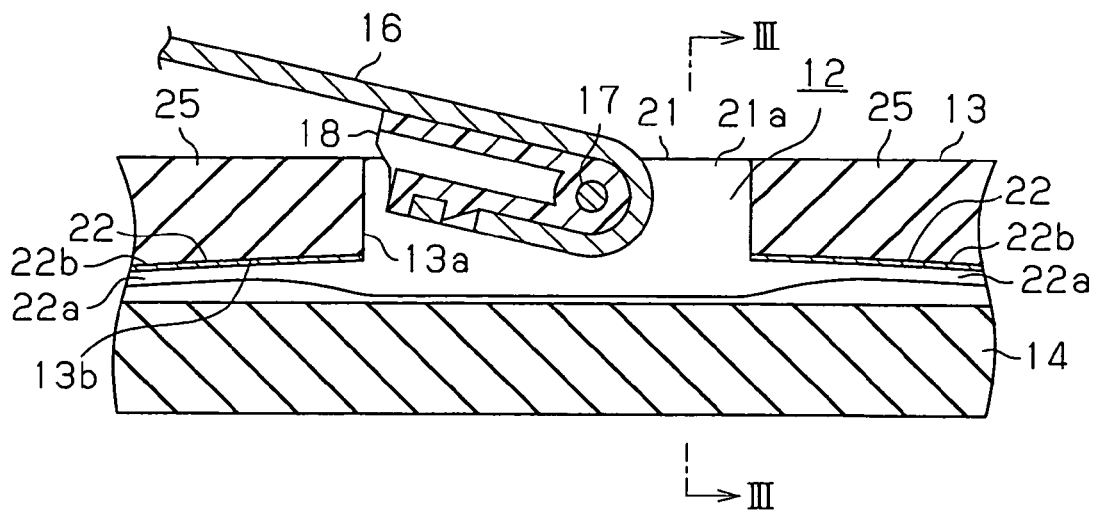
FIG. 2 is a cross sectional view taken along line II-II in FIG. 1A.

An embodiment of the present invention will be described with reference to the accompanying drawings.

With reference to FIGS. 1A and 1B, a wiper blade 11 according to the embodiment includes a lever 12, a fin member 13, a wiper strip 14 and two backing plates 15. The fin member 13 is secured to the lever 12. The wiper strip 14 is held by the lever 12 and the fin member 13. The backing plates 15 are fitted into the wiper strip 14. The wiper blade 11 is rotatably connected to a distal end of a wiper arm 16 and is urged against a wiping surface 26 (FIG. 7), such as a windshield surface, by the wiper arm 16. A base end of the wiper arm 16 is secured to a pivot shaft (not shown), which is swung by a drive source, such as a motor (not shown), of a wiper system. When the wiper arm 16 is swung together with the pivot shaft, the wiper blade 11 wipes the wiping surface 26.

Figure 4:
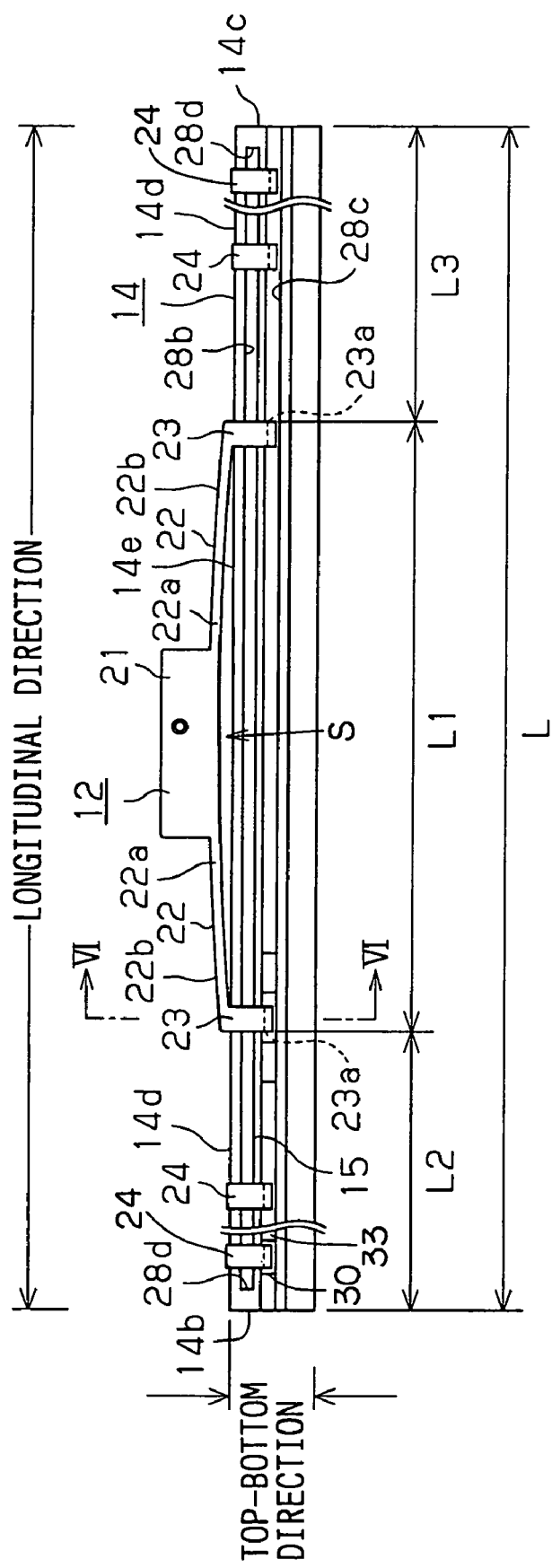
FIG. 4 is an enlarged partial front view of the wiper blade after removal of a fin member.

As shown in FIGS. 1A, 1B and 4, the lever 12 is an integral component and includes a connecting arrangement 21, two arms (first and second arms) 22 and two holding portions 23. The arms 22 extend from the connecting arrangement 21 on opposite longitudinal sides (first and second longitudinal sides), respectively of the connecting arrangement 21 in a longitudinal direction of the wiper strip 14. Each holding portion 23 is provided to a distal end of a corresponding one of the arms 22. The wiper blade 11 is rotatably connected to the wiper arm 16 at the connecting arrangement 21 of the lever 12.

Figure 5:
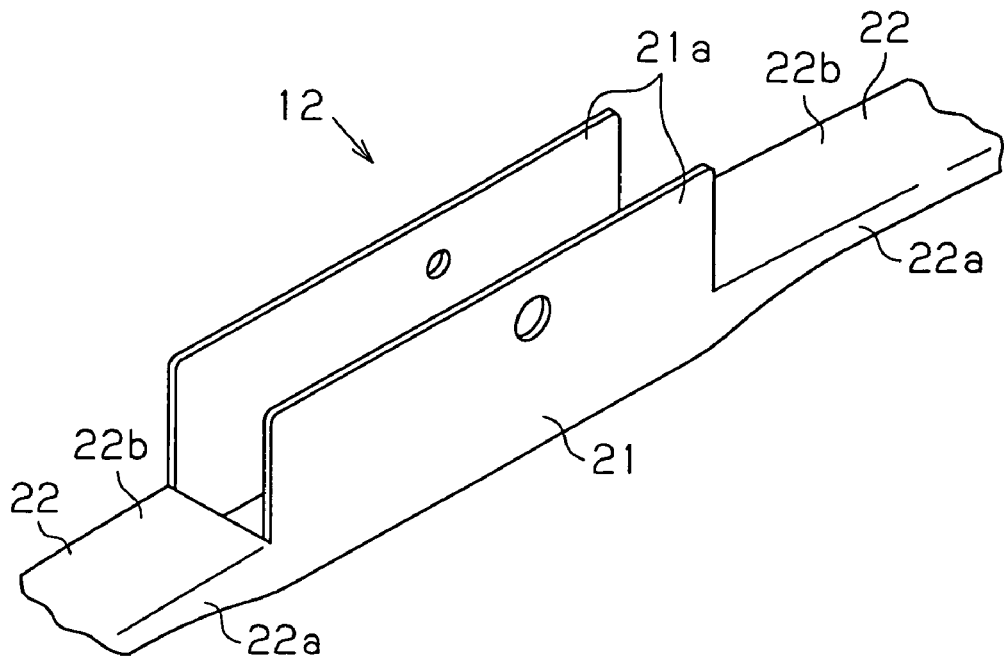
FIG. 5 is a partial perspective view of a lever of the wiper blade.

More specifically, the connecting arrangement 21 includes two generally rectangular walls 21a (FIG. 5). The rectangular walls 21a are separated from one another in a transverse direction (in a left-right direction in FIG. 3) of the connecting arrangement 21 and project upwardly in a direction (more specifically, in an upward direction in FIG. 3) opposite from the wiper strip 14. As shown in FIG. 2, a connecting member 18 is provided in the connecting arrangement 21. The connecting member 18 is rotatably supported by a rotational shaft 17, which connects between the rectangular walls 21a. A distal end of the wiper arm 16 includes a U-shaped hook. The wiper blade 11 is rotatably connected to the wiper arm 16 when the U-shaped hook of the wiper arm 16 is connected to the connecting member 18 in the connecting arrangement 21.

As shown in FIG. 5, each arm 22 of the lever 12 has a U-shaped cross section and includes two lateral walls 22a and a cover wall 22b. Each lateral wall 22a extends continuously from a base end of a corresponding one of the rectangular walls 21a in the longitudinal direction of the wiper strip 14. The lateral walls 22a of each arm 22 are connected together by the cover wall 22b. As shown in FIG. 4, each arm 22 (the lateral walls 22a) also projects in a top-bottom direction (more specifically, in a downward direction in FIG. 4) of the wiper strip 14 toward the distal end of the arm 22. Thus, a space S is formed between each arm 22 and the wiper strip 14 (more specifically, a top surface 14e of the wiper strip 14). The space S extends in the top-bottom direction and increases toward the base end (a connecting arrangement 21 side end) of the arm 22. The space S is provided to permit flexing of the wiper strip 14 in the top-bottom direction in FIG. 4. More specifically, when the wiper strip 14 is convexly flexed in the top-bottom direction in FIG. 4 due to the wiping operation, the space S accommodates a flexed projection of the wiper strip 14 to permit flexing of the wiper strip 14. The rectangular walls 21a of the connecting arrangement 21, which are spaced from one another in the transverse direction, are integrated with the lateral walls 22a and the cover wall 22b of each arm 22, which extend continuously from the rectangular walls 21a.

Figure 6:
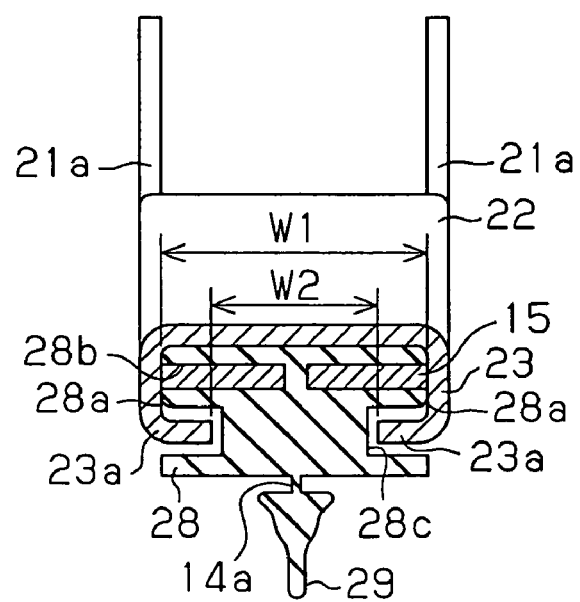
FIG. 6 is a cross sectional view taken along line VI-VI in FIG. 4.

As shown in FIG. 4, each holding portion 23 of the lever 12 is formed in the distal end of the corresponding arm 22. Furthermore, as shown in FIG. 6, the distal end of each holding portion 23 includes two holding claws 23a, which are opposed to one another in the transverse direction (in the left-right direction in FIG. 6) and are bent at generally a right angle. The lever 12 holds the wiper strip 14 together with the backing plates 15 when the holding claws 23a of each holding portion 23 engage a connecting portion 28 of the wiper strip 14.

As shown in FIGS. 1A and 1B, the fin member 13 is slightly longer than the wiper strip 14 in the longitudinal direction. Furthermore, the fin member 13 is made of an elastic material, such as a rubber material or an elastomer material. Preferably, the elastic material of the fin member 13 has elasticity equal to or smaller than that of the wiper strip 14, i.e., is more flexible in comparison to that of the wiper strip 14. The fin member 13 is securely joined to the lever 12 in such a manner that the fin member 13 surrounds one side (the top side in FIG. 1B) of the lever 12 and the wiper strip 14, which is opposite from the wiping surface 26.

Figure 7:
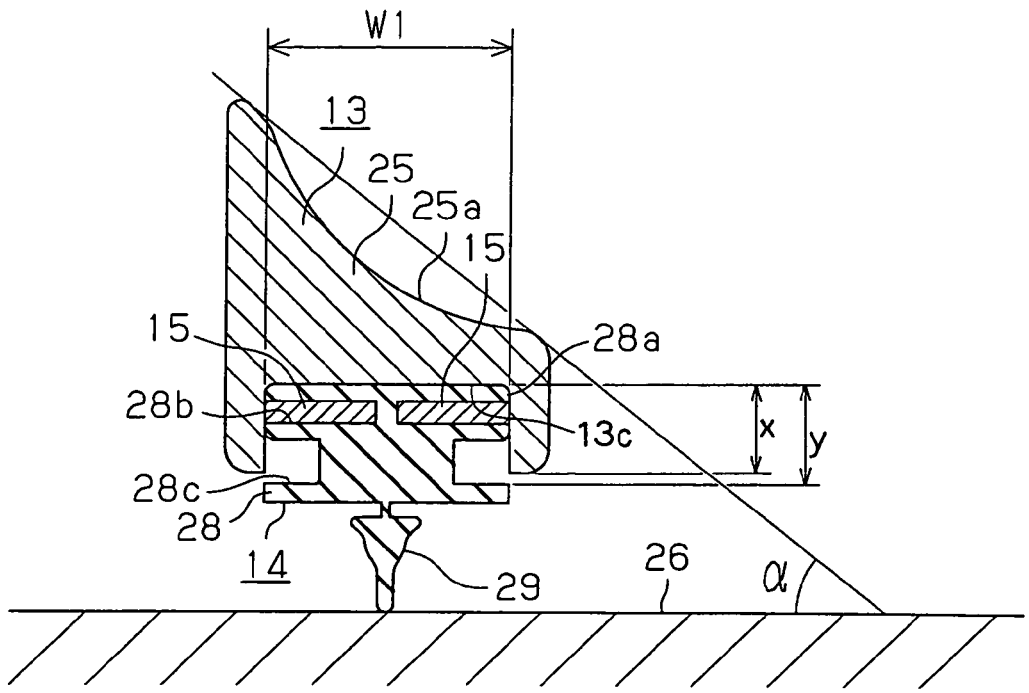
FIG. 7 is a cross sectional view taken along line VII-VII in FIG. 1B.

More specifically, a receiving hole 13a is formed in the longitudinal center of the fin member 13 to receive the connecting arrangement 21 of the lever 12. The fin member 13 further includes two primary receiving grooves 13b and two secondary receiving grooves 13c. The primary receiving grooves 13b extend away from each other in the longitudinal direction from the receiving hole 13a on opposite longitudinal sides, respectively of the receiving hole 13a. Each primary receiving groove 13b is recessed to have a U-shaped cross section to correspond with the lateral walls 22a and the cover wall 22b of the corresponding arm 22. Each secondary receiving groove 13c is recessed to have a U-shaped cross section and extends from the corresponding primary receiving groove 13b to the corresponding longitudinal end of the wiper strip 14. As shown in FIG. 7, a depth "x" of the secondary receiving groove 13c, which is measured from an inner wall surface of the secondary receiving groove 13c, is smaller than a distance "y" between the top surface 14e (FIG. 4) of the connecting portion 28 of the wiper strip 14 and a bottom inner surface of one of two holding groove 28c. The primary receiving grooves 13b and the secondary receiving grooves 13c serve as receiving portions of the present invention. Each cover wall 22b and the opposed primary receiving groove 13b are joined together by, for example, adhesive or bond while the connecting arrangement 21 is received in the receiving hole 13a. In this way, the fin member 13 is secured to the lever 12.

As shown in FIG. 1B, a plurality of grippers 24 (three grippers 24 on each longitudinal side of the fin member 13 in the embodiment) is secured to the fin member 13 in such a manner that the grippers 24 are spaced from each other. The grippers (retaining members) 24 are provided in two end follower sections 14d of the wiper strip 14. Each end follower section 14d extends between the corresponding holding portion 23 of the lever 12 and a corresponding one (i.e., a closest one) of longitudinal ends (first and second longitudinal ends) 14b, 14c of the wiper strip 14, as shown in FIG. 4.

Figure 8:
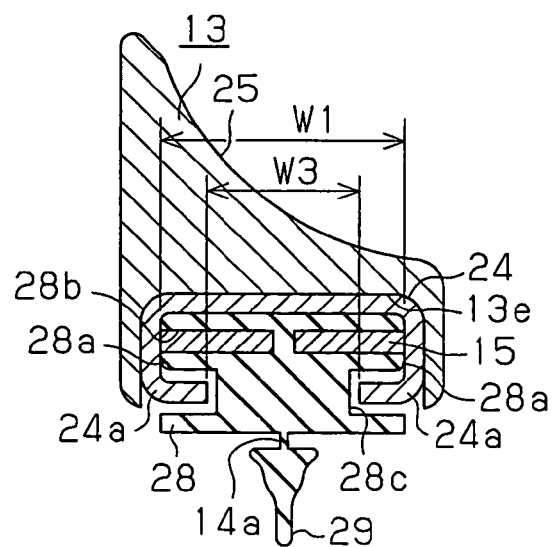
FIG. 8 is a cross sectional view taken along line VIII-VIII in FIG. 1B.

More specifically, a plurality of receiving recesses 13e is provided in the fin member 13 to correspond with the grippers 24. As shown in FIG. 8, each receiving recess 13e has a U-shaped cross section and is recessed to a predetermined depth from the inner wall surface of the corresponding secondary receiving groove 13c. Each gripper 24, which has the U-shaped cross section, is secured to an inner wall surface of the corresponding receiving recess 13e by, for example, the adhesive or bond. Distal ends of lateral walls of each gripper 24 have holding claws 24a, which are opposed to each other in the transverse direction (the left-right direction in FIG. 8) and are bent toward each other at generally a right angle. Each gripper 24, which is secured to the fin member 13, is formed in such a manner that an inner wall surface of the gripper 24 is generally flush with the inner wall surface of the corresponding secondary receiving groove 13c to continuously extends the inner wall surface of the gripper 24 from the inner wall surface of the secondary receiving groove 13c. The grippers 24, which are secured to the fin member 13, hold the wiper strip 14 together with the backing plates 15 when the holding claws 24a of the grippers 24 engage the wiper strip 14.

As shown in FIGS. 1, 7 and 8, the fin member 13 includes the primary and secondary receiving grooves 13b, 13c on the side where the wiping surface 26 is located. Furthermore, the fin member 13 also includes two fin portions 25 having a generally triangular cross section on the side opposite from the wiping surface 26. The fin portions 25 are provided on the opposite longitudinal sides, respectively, of the fin member 13 with respect to the receiving hole 13a (the connecting arrangement 21). Each fin portion 25 has a sloped concave surface 25a, which defines an acute angle α relative to the wiping surface 26, as shown in FIG. 7. In this way, the sloped concave surface 25a of each fin portion 25 can effectively receive wind, which is applied to the running vehicle, to disperse the drag force and to directly apply the force component of the drag force to the wiper strip 14 to limit lifting of the wiper strip 14 from the wiping surface 26.

Figure 3:
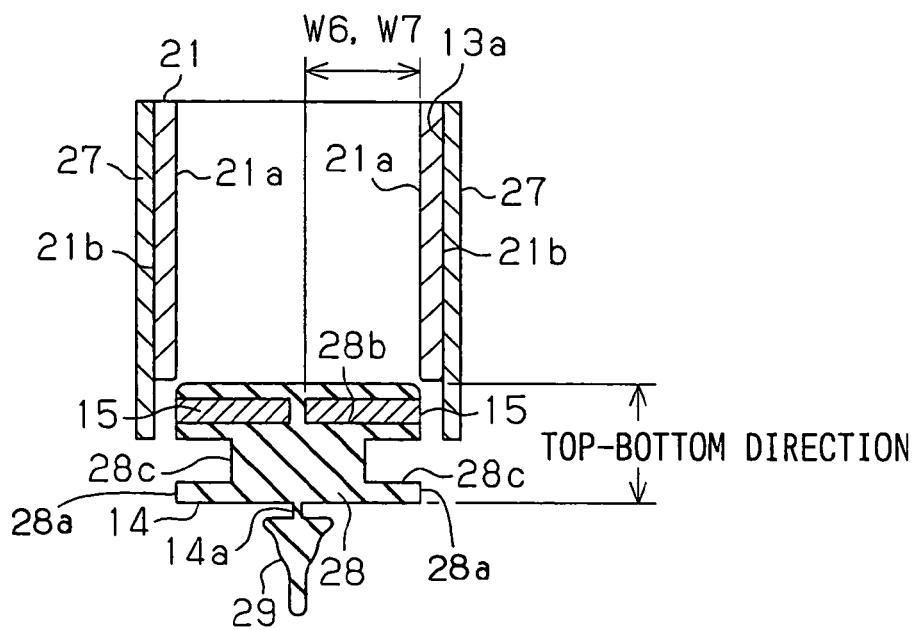
FIG. 3 is a cross sectional view taken along line III-III in FIG. 2.

As shown in FIG. 3, the fin portions 25, which are respectively arranged on the opposite longitudinal sides of the connecting arrangement 21, are connected together by cover portions 27 of the fin member 13, which form inner lateral wall surfaces, respectively, of the receiving hole 13a. The cover portions 27 cover outer lateral surfaces 21b of the connecting arrangement 21 (the rectangular walls 21a) in such a manner that the cover portions 27 protrude from the connecting arrangement 21 on the wiping surface 26 side.

As shown in FIG. 1, a stopper wall 25b is formed in the longitudinal end of each fin portion 25 in such a manner that the stopper wall 25b extends continuously, downwardly from the inner wall surface of the corresponding secondary receiving groove 13c. When the wiper strip 14 engages the stopper wall 25b in the longitudinal direction of the wiper strip 14, the stopper wall 25b limits longitudinal movement of the wiper strip 14.

With reference to FIG. 3, the wiper strip 14, which is connected to the lever 12 and the fin member 13 (the grippers 24), is made of a rubber material and is shaped as an elongated body. The wiper strip 14 includes the connecting portion 28 and a wiping lip 29, which is connected to the connecting portion 28 through a neck portion 14a. The wiper strip 14 is held by the lever 12 and the fin member 13 (the grippers 24) through the connecting portion 28 and wipes the wiping surface 26 through the wiping lip 29.

The connecting portion 28 includes the two backing grooves 28b and the two holding grooves 28c. The two backing grooves 28b are recessed from two opposed outer lateral surfaces 28a, respectively, of the connecting portion 28 in the transverse direction (the left-right direction in FIG. 3) and extend in the longitudinal direction of the wiper strip 14. Similarly, the two holding grooves 28c are recessed from the two opposed outer lateral surfaces, 28a, respectively, of the connecting portion 28 in the transverse direction (the left-right direction in FIG. 3) and extend in the longitudinal direction of the wiper strip 14. The, backing grooves 28b are closer to the lever 12 (and the fin member 13) in comparison to the holding grooves 28c in the top-bottom direction, i.e., are located on the top side of the holding grooves 28c in FIG. 3.

The backing grooves 28b are provided to receive the backing plates 15. As shown in FIG. 4, each longitudinal end of the each backing groove 28b forms a limiting surface 28d, which limits longitudinal movement of the corresponding backing plate 15, which is inserted into the backing groove 28b in the transverse direction.

The holding grooves 28c are arranged to receive the holding claws 23a of the lever 12 (the holding portions 23) and the holding claws 24a of the grippers 24 when the connecting portion 28 is held by the lever 12. That is, with reference to FIG. 6, a transverse width W2 between opposed distal ends of the holding claws 23a of the lever 12 is set to be smaller than a transverse width W1 between the outer lateral surfaces 28a of the connecting portion 28. Furthermore, with reference to FIG. 8, a width W3 between opposed distal ends of the holding claws 24a of each gripper 24 is set to be smaller than the width W1. The holding claws 23a, 24a are formed to correspond with the holding grooves 28c in the top-bottom direction. The wiper strip 14 is held by the lever 12 and the grippers 24 through the holding claws 23a, 24a, which are received in the holding grooves 28c. Since the holding claws 23a, 24a are received only in the holding grooves 28c, the holding claws 23a, 24a do not limit sliding movement of the wiper strip 14 relative to the lever 12. That is, when the wiper blade 11 is swung along the curved wiping surface 26, the wiper strip 14 conforms to the curved wiping surface 26, so that the amount of flexing of the wiper strip 14 changes. When the amount of flexing of the wiper strip 14 changes, the actual length of the portion of the wiper strip 14, which is positioned between the holding portions 23 of the lever 12, also changes. This change in the actual length of the portion of the wiper strip 14, which is positioned between the holding portions 23, is permitted by permitting the longitudinal sliding movement of the wiper strip 14 relative to the lever 12. Thus, effective elastic conformance of the wiper strip 14, i.e., effective elastic compliance of the wiper strip 14 with respect to the wiping surface 26 at the time of wiping the wiping surface 26 is permitted.

Figure 9:
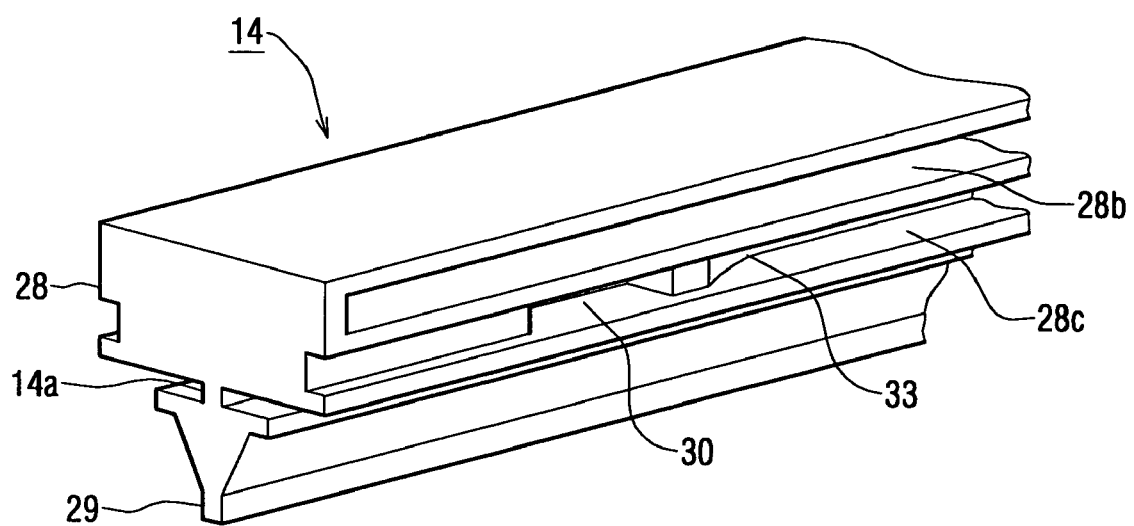
FIG. 9 is a partial perspective view showing a longitudinal end of a wiper strip.

With reference to FIG. 9, an anchoring portion 30 in a form of a recess is formed at one end of each holding groove 28c, which is located near the longitudinal end 14b of the wiper strip 14. Furthermore, in each holding groove 28c, a sloped wall 33 is provided adjacent the anchoring portion 30 in such a manner that a transverse depth of the sloped wall 33 progressively decreases toward the anchoring portion 30. With reference to FIG. 4, the anchoring portions 30 receive the holding claws 24a of the left end gripper 24, which is placed adjacent the longitudinal end 14b of the wiper strip 14. At the time of installing the wiper strip 14 to the fin member 13 and the lever 12, the longitudinal end 14c of the wiper strip 14 is first installed such that the holding grooves 28c of the wiper strip 14 receive the holding claws 24a of the grippers 24 and the holding claws 23a of the holding portions 23. When the left end gripper 24 in FIG. 4 reaches the sloped wall 33, each holding claw 24a of the gripper 24 elastically deforms the corresponding sloped wall 33 and is then received in the corresponding anchoring portion 30, so that further longitudinal movement of the wiper strip 14 relative to the fin member 13 and the lever 12 is limited by opposed longitudinal end wall surfaces of each anchoring portion 30, which extend in a direction perpendicular to the longitudinal direction of the wiper strip 14.

The wiping lip 29 of the wiper strip 14 is formed to have a generally triangular cross section and is connected to the connecting portion 28 through the neck portion 14a in a tiltable manner.

Each backing plate 15 is made of a metal material (e.g., a spring metal) having spring characteristics and is formed into an elongated plate shape. Furthermore, in a natural relaxed state of the backing plate 15, i.e., in a state where no load is applied to the backing plate 15 from the wiping surface 26, the backing plate 15 is convexly curved in a direction away from the wiping surface 26 and has a larger curvature (i.e., a smaller radius of curvature) in comparison to the that of the wiping surface 26. The backing plate 15 is completely received in the corresponding backing groove 28b. More specifically, with reference to FIG. 3, a transverse width W6 of the backing plate 15 is set to be equal to or smaller than a transverse width W7 of the backing groove 28b.

When each backing plate 15 is fitted into the corresponding backing groove 28b, the wiper blade 11 is deformed to correspond with the shape of the backing plate 15. Furthermore, the backing plate 15 has predetermined rigidity and spring characteristics, so that when pressure is applied from the wiper arm 16 at the time of wiping the wiping surface 26, the wiper strip 14 is elastically flexed to conform with the curvature of the wiping surface 26.

Positions of the holding portions 23 of the lever 12 (i.e., the position of the lever 12) in the longitudinal direction of the wiper strip 14 will be described. The holding portions 23 of the lever 12 are arranged such that the holding portions 23 divide the wiper strip 14 into three sections, each of which has a generally equal length. More specifically, with reference to FIG. 4, an entire length of the wiper strip 14 is denoted by L. A length L1 between the holding portions 23 of the lever 12 is generally equal to a length L2 between one of the holding portions 23 and the corresponding longitudinal end 14b of the wiper strip 14 and is also generally equal to a length L3 between the other one of the holding portions 23 and the corresponding longitudinal end 14c. Thus, each holding portion 23 is spaced generally one-third of the entire length of the wiper strip 14 from the corresponding longitudinal end 14b, 14c of the wiper strip 14. With this arrangement, the wiper strip 14 is held by the holding portions 23 (the holding claws 23a) at its longitudinal center section. Each end follower section 14d of the wiper strip 14, which flexes to substantially freely and elastically conform to the wiping surface 26, is located between the holding claws 23a of the corresponding holding portion 23 and the corresponding longitudinal end 14b, 14c of the wiper strip 14.

Figure 10A:
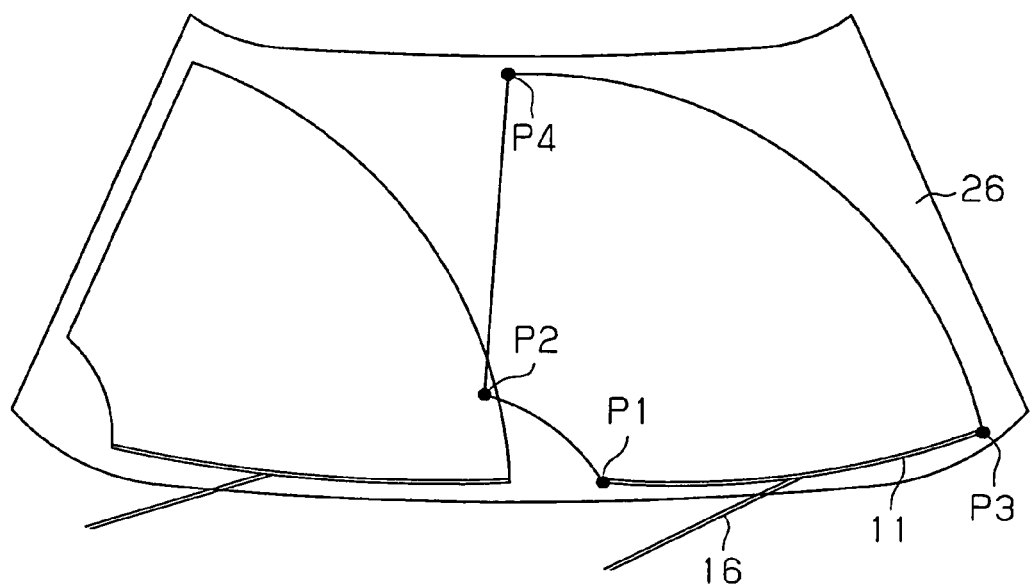
FIG. 10A is a schematic descriptive view showing the wiper blades arranged on a wiping surface of a windshield.
Figure 10B:
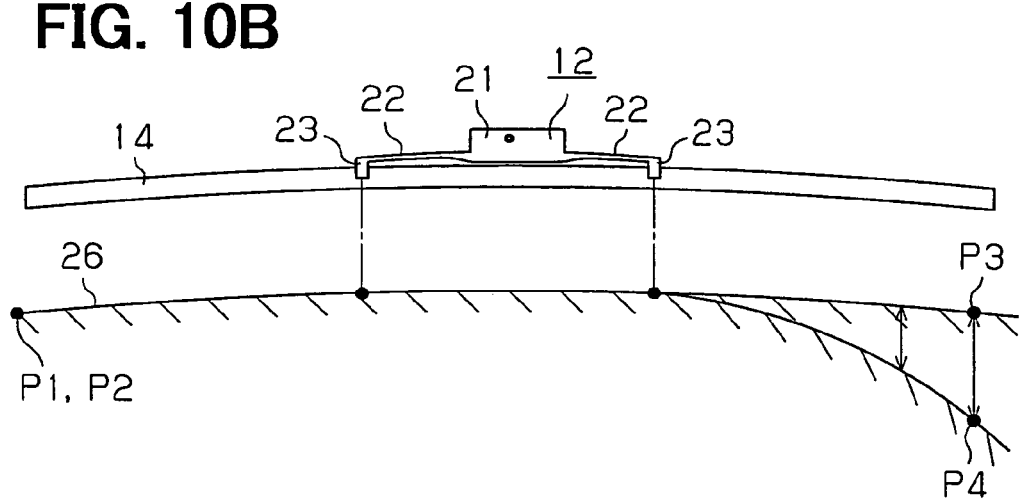
FIG. 10B is a schematic descriptive view showing a change in surface curvature of the wiping surface.

Each holding portion 23 is arranged at a corresponding point of the wiper blade 11, which moves along the wiping surface 26 through a path that shows a relatively small change in the surface curvature in comparison to the rest of the wiping surface 26 when the wiper strip 14 (the wiping lip 29) swings to wipe the wiping surface 26. More specifically, with reference to FIG. 10A, at the time of wiping the wiping surface 26, an inner end (a left end in FIG. 10A) of the wiper blade 11 moves between an operating point P1 and an operating point P2. Also, an outer end (a right end in FIG. 10A) of the wiper blade 11 moves between an operating point P3 and an operating point P4. The path between the operating point P1 and the operation point P2 and the path between the operating point P3 and the operating point P4 are located in a front passenger side of a vehicle with a right-hand steering wheel. FIG. 10B shows changes in the curvature of the wiping surface 26 along these paths at the time of wiping the wiping surface 26. As clearly understood from FIG. 10B, a change in the curvature, which is measured on the side where the operating points P1, P2 are located, is relatively small. Contrary to this, a change in the curvature, which is measured on the side where the operating points P3, P4 are located, is relatively large. Accordingly, a change in the curvature measured between the operating point P3 and the operating point P4 becomes relatively large. Because of this, the holding portions 23 of the lever 12 are provided in the longitudinal center section of the wiper blade 11, which is apart from the outer end of the wiper blade 11 where the operating points P3 and P4 are located, so that the holding portions 23 are provided in the section of the wiper blade 11, at which the change in the curvature of the wiping surface 26 is relatively small. In a case where the holding portions 23 are provided in or adjacent to the outer end of the wiper blade 11, the structure would be similar to that of the prior art, so that the end follower section 14d of the wiper strip 14 cannot be formed. Furthermore, in such a case, the elastic compliance of the wiper strip 14 for complying with the change in the curvature of the wiping surface 26 is limited by the holding portions 23, causing negative influences on the wiping performance at that location.

Next, assembly of the wiper blade 11 will be described. As shown in FIG. 1B, the fin member 13 is secured to the lever 12 in such a manner that the connecting arrangement 21 is received in the receiving hole 13a, and the fin member 13 is secured to the arms 22. At this time, as shown in FIG. 8, in the fin member 13, the grippers 24 are securely held in the receiving recesses 13e, respectively. In this state, the holding claws 23a of the lever 12 (the holding portions 23) and the holding claws 24a of the grippers 24 are located in the primary receiving grooves 13b and the secondary receiving grooves 13c of the fin member 13 to engage with the wiper strip 14.

The backing plates 15 are previously installed into the backing grooves 28b of the wiper strip 14. Upon the installation of the backing plates 15, the wiper strip 14 is installed to the fin member 13 and the lever 12 from the longitudinal end 14c of the wiper strip 14, which is opposite from the other longitudinal end 14b where the anchoring portion 30 is provided, so that the holding claws 24a, 23a are sequentially received in the holding grooves 28c of the wiper strip 14 to place the wiper strip 14 in the holding position, at which the wiper strip 14 is operably held by the lever 12. At the time of inserting the wiper strip 14 relative to the fin member 13 and the lever 12, the holding claws 24a of the last gripper 24 is held in the anchoring portion 30, so that the wiper strip 14 is positioned in the holding position and is held by the fin member 13 (the grippers 24) and the lever 12. It should be understood that unintentional removal of the wiper strip 14 from the fin member 13 and the lever 12 can be limited through engagement of the wiper strip 14 with the stopper walls 25b of the fin member 13. When the holding claws 24a, 23a are received in the holding groove 28c of the wiper strip 14, the lateral opening (the outer transverse side) of each backing groove 28b is covered partially by the holding portions 23 of the lever 12 and the grippers 24. Thus, unintentional removal of the backing plates 15, which are received in the backing grooves 28b, is prevented by the holding portions 23 and the grippers 24.

The connecting portion 28 of the wiper strip 14 is received in the primary and secondary grooves 13b, 13c of the fin member 13, so that the remaining opening of each backing groove 28b is closed, and removal and external exposure of each backing plate 15 is prevented, as shown in FIG. 7.

As described above, according to the present embodiment, the following advantages can be achieved.

(1) In the present embodiment, the urging force of the wiper arm 16 is applied to the wiper strip 14 through the single lever 12. Thus, in comparison to the tournament type wiper, the height of the wiper blade 11 can be reduced.

Furthermore, the urging force of the wiper arm 16 is spread in the longitudinal direction of the wiper strip 14, so that excessive concentration of the urging force to the longitudinal center of the wiper strip 14 can be reduced. Thus, the wiper streaking on the wiping surface 26 can be effectively limited at the time of wiping the wiping surface 26 with the wiper strip 14, thereby achieving good wiping performance.

Furthermore, each holding portion 23 of the lever 12 is located in the intermediate point between the corresponding longitudinal end 14b, 14c of the wiper strip 14 and the connecting arrangement 21, so that free flexing of the backing plates 15 is permitted at each end portion of the wiper blade. The wiper strip 14, which has the backing plates 15 received in the backing grooves 28b, includes the end follower sections 14d, which shows the good elastic compliance relative to the wiping surface 26, i.e., which can elastically conform to the wiping surface 26. Each end follower section 14d is provided between the corresponding holding portion 23 of the lever 12 and the corresponding longitudinal end 14b, 14c of the wiper strip 14. Thus, the elastic compliance of the wiper strip 14, which is achieved by the backing plates 15, relative to the wiping surface 26 is not interfered by the lever 12, resulting in good wiping performance.

The wiper strip 14 is held by the holding portions 23, each of which is spaced away from the connecting arrangement 21 in the longitudinal direction of the wiper strip 14 by the corresponding arm 22. Thus, it is not required to unnecessarily increase the length of the end portion (the end follower section 14d) of the wiper strip 14. As a result, the torsional rigidity of each end portion of the wiper strip 14 (i.e., the rigidity in the torsional direction about the axis that extends in the longitudinal direction of the wiper strip) can be improved without interfering the elastic compliance of the end portion of the wiper strip 14. In this way, even in the case of the relatively long wiper strip (the relatively long wiper blade), which is longer than the wiper strip of the lever-less wiper blade, smooth wiping movement and good wiping performance can be achieved due to achievement of the good operational position (attack angle) of the wiper strip 14 relative to the wiping surface 26 through improvement of the elastic compliance and the torsional rigidity of the wiper strip 14.

(2) In the present embodiment, the urging force of the wiper arm 16 is spread by the arms 22 of the lever 12 and is applied to the wiper strip 14 through the two holding portions 23 located at the two locations that divide the length of the wiper strip 14 into the three sections, each of which has the generally equal length. Thus, the wiper strip 14 does not have an excessively pressurized portion, at which the urging force against the wiping surface 26 is excessively concentrated, along the length of the wiper strip 14. As a result, the urging force can be generally equally spread along the length of the wiper strip 14.

(3) In the present embodiment, the free flexing of each backing plate 15 is partially limited in the holding portions 23. However, the free flexing of the wiper strip 14 is permitted between each holding portion 23 and the corresponding longitudinal end of the wiper blade 11. Therefore, the limiting of the free flexing at each holding portion 23 has only small influence on the wiping performance. Furthermore, each holding portion 23 is arranged at the corresponding point of the wiper blade 11, which moves along the wiping surface 26 through the path that shows the relatively small change in the curvature of the wiping surface 26 when the wiper strip 14 wipes the wiping surface 26. Thus, the required amount of flexing of the wiper strip 14 at this point, in which the holding portion 23 is located, is relatively small. As a result, the holding portions 23 pose only the small influence on the wiping performance.

(4) In the present embodiment, each sloped concave surface 25a of the fin member 13 receives the wind, which is applied to the running vehicle, to provide the force that reinforces the urging force of the wiper arm 16 and thereby to limit the lifting of the wiper strip 14 at the time of high speed running of the vehicle. The fin member 13 is secured to the lever 12 and the grippers 24, which cooperate together to hold the wiper strip 14, and the fin member 13 is provided on both the opposite longitudinal sides of the wiper strip 14 with respect to the connecting arrangement 21. Thus, at the time of high speed running of the vehicle, the fin member 13 can reinforce the urging force of the wiper arm 16 along the entire length of the wiper strip 14.

(5) In the present embodiment, at least a portion of the connecting portion 28 of the wiper strip 14, in which the backing grooves 28b are formed, is received in the primary and secondary receiving grooves 13b, 13c of the fin member 13. Thus, the height of the wiper blade 11 can be reduced, and appearance of the wiper blade 11 viewed from the lateral surface side of the wiper blade 11 can be improved. For example, the lateral opening of each backing groove 28b is covered with the fin member 13. Thus, the backing plates 15 are not externally exposed, and thus it is possible to provide a good appearance of the wiper blade 11 without requiring painting of the metal backing plates 15 with a color (generally black color, which is antiglare color) that coincides with a color of the wiper strip 14. Furthermore, the connecting portion 28 of the wiper strip 14 is received in the primary and secondary receiving grooves 13b, 13c in such a manner that the backing grooves 28b are received in the primary and secondary receiving grooves 13b, 13c. In general, water droplets adhered to the backing plates, which are made of the spring material (generally, the metal material), are likely frozen during the cold winter season. However, in the present embodiment, the backing plates 15 made of the spring material are covered by the fin member 13. Therefore, it is possible to limit freezing of the water droplets adhered to the backing plates 15. Furthermore, protrusion of the backing plates 15 from the backing grooves 28b can be prevented, and the edges of the backing plates 15 can be protected.

(6) In the present embodiment, the cover portions 27, which connect between the fin portions 25, cover both the outer lateral surfaces 21b of the connecting arrangement 21 (the rectangular walls 21a) of the lever 12. Thus, the fin member 13 aids in achievement of an integral design of the wiper blade 11, thereby improving the appearance of the wiper blade 11.

(7) In the present embodiment, the relative longitudinal movement (removal) of the wiper strip 14 is prevented when the wiper strip 14 engages the stopper wall 25b of the fin member 13 without requiring provision of a separate engaging structure, which prevents the longitudinal movement of the wiper strip 14 relative to the fin member 13.

(8) In the present embodiment, both the backing plates 15 and the wiper strip 14 are held by the grippers 24, so that protrusion of the lateral edges of the backing plates 15 from the backing grooves 28b is advantageously prevented. Therefore, the good elastic compliance of the wiper strip 14 relative to the wiping surface 26 can be maintained by the backing plates 15. Furthermore, the grippers 24 are secured to the fin member 13. Thus, the above-described reinforcement of the urging force of the wiper arm 16 can be directly performed even in the end follower sections 14d of the wiper strip 14 without use of levers.

(9) In the present embodiment, when the wiper strip 14 elastically follows the wiping surface 26, the wiper strip 14 is convexly flexed away from the wiping surface 26 in such a manner that the longitudinal center section of the wiper strip 14, i.e., the section of the wiper strip 14, which is located in the connecting arrangement 21 of the lever 12, forms an apex of the flexed wiper strip 14. The protrusion of the apex of the wiper strip 14 is permitted by the corresponding space S, which is defined by the lateral walls 22a of the corresponding arm 22 and the top surface 14e (FIG. 4) of the wiper strip 14. Thus, the elastic compliance of the wiper strip 14, which includes the backing plates 15, can be further improved.

The embodiment of the present invention can be modified as follows.

Figure 11:
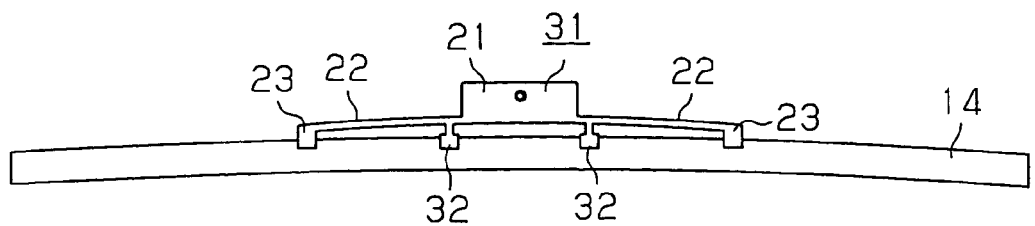
FIG. 11 is a front view showing a modification of the wiper blade.

In the above embodiment, the holding portions of the lever are not limited to the above holding portions 23, each of which is provided in the end of the corresponding arm 22. More specifically, as shown in FIG. 11, another holding portion 32, which is similar to the holding portion 23, can be additionally provided between each holding portion 23 and the connecting arrangement 21 in each arm 22 of a lever 31. Even in this case, the added holding portions 32 do not limit the longitudinal sliding movement of the wiper strip 14 relative to the lever 31. Furthermore, each arm 22 can have more than one holding portion 32. Furthermore, the number of holding portions 32 provided in one of the arms 22 can be different from the number of holding portions 32 provided in the other one of the arms 22. That is, what is required is the provision of the holding portion at the distal end of each arm 22.

Figure 12A:
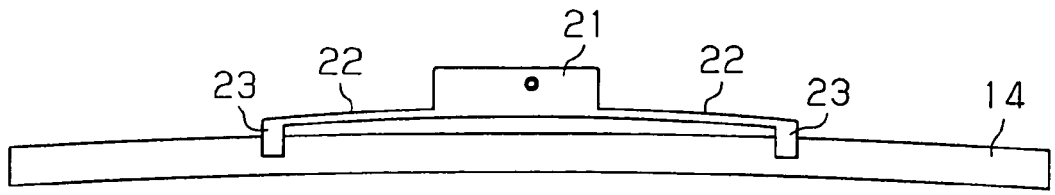
FIG. 12A is a front view showing another modification of the wiper blade.
Figure 12B:
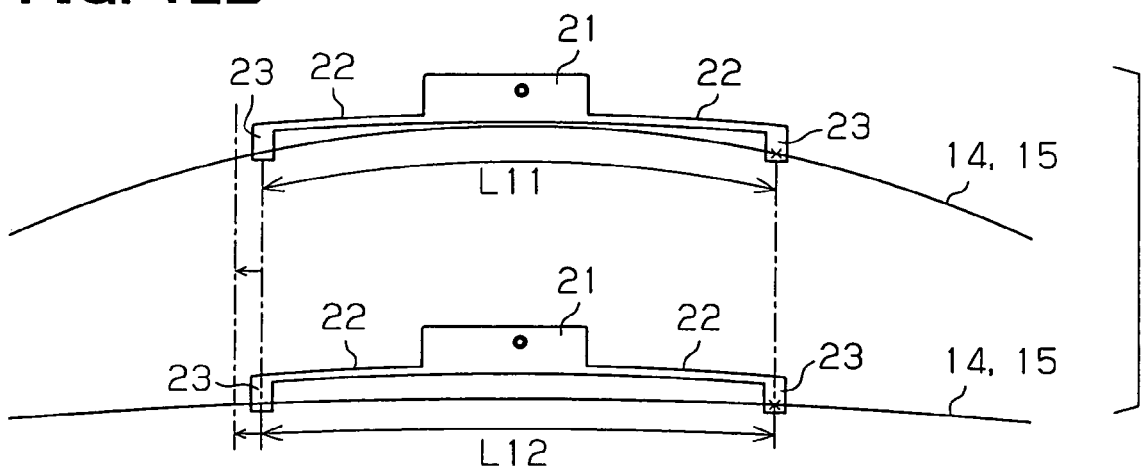
FIG. 12B is a schematic descriptive view showing two states of the wiper blade shown in FIG. 12A.

In the above embodiment, one of the two holding portions 23, which hold the wiper strip 14, can be immovably secured to the wiper strip 14. For example, in the case of FIG. 12A, the right side holding portion 23 is immovably secured to the wiper strip 13. In this case, the wiper strip 14 can flex and longitudinally slide relative to the secured right side holding portion 23 at the time of wiping the wiping surface 26 to conform to the wiping surface 26. More specifically, the wiper strip 14, in which the backing plates 15 are fitted, has an actual length L11, which is measured along an arc of the wiper strip 14 between the left and right side holding portions 23 in the natural relaxed state, as shown in the top side of FIG. 12B. In this state, when the wiper blade 11 (the wiper strip 14) is urged against the wiping surface 26 (see the bottom side of FIG. 12B), the left end of the wiper strip 14 longitudinally slides away from the secured right side holding portion 23 such that the left end of the wiper strip 14, which is opposite from the secured right side holding portion 23, protrudes longitudinally. At this time, the wiper strip 14, in which the backing plates 15 are fitted, is elastically flexed to have an actual length L12 (<L11), which is measured along an arc of the wiper strip 14 between the left and right side holding portions 23. Thus, the elastic compliance of the wiper strip 14 is not substantially interfered.

Figure 13:
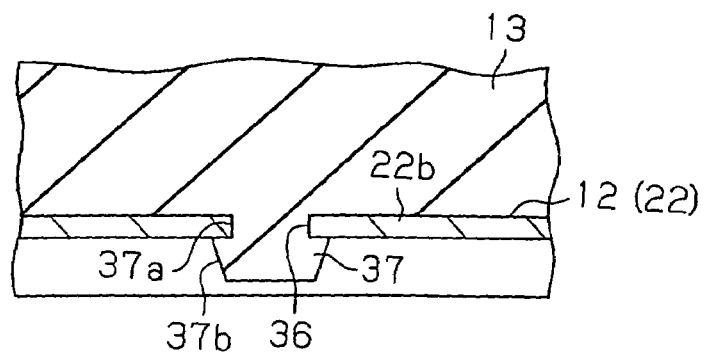
FIG. 13 is an enlarged partial view showing another modification of the wiper blade.
Figure 16A:
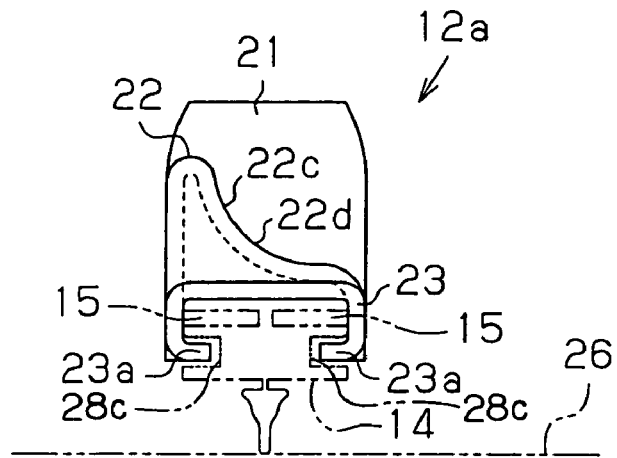
FIG. 16A is a cross sectional view of the wiper blade shown in FIG. 14.
Figure 16B:
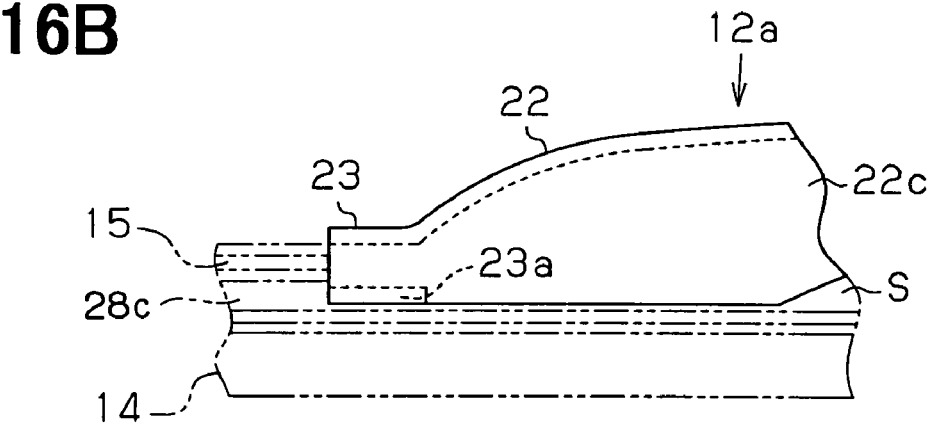
FIG. 16B is a partial front view showing the wiper blade shown in FIG. 14.
Figure 16C:
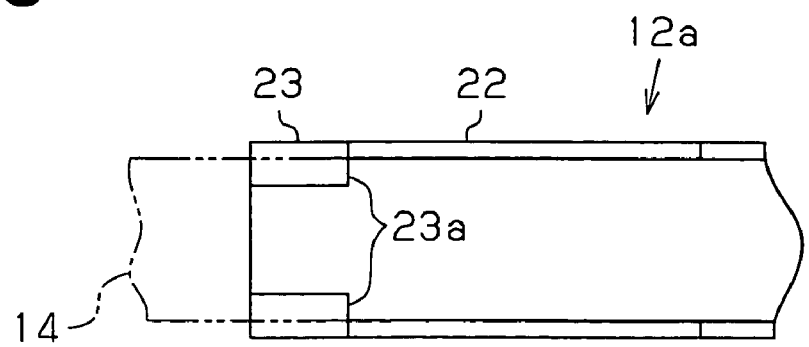
FIG. 16C is a partial bottom view showing the wiper blade shown in FIG. 14.

In the above embodiment, the fin member 13 is joined to the arms 22 of the lever 12, so that the fin member 13 is secured to the lever 12. Alternatively, the fin member 13 can be secured to the lever 12 in a manner shown in FIG. 13. More specifically, an engaging hole 36 is formed in the cover wall 22b of each arm 22 to extend in the top-bottom direction in FIG. 13. In the fin member 13, an engaging projection 37 projects from the inner wall of each primary receiving groove 13b at a location that coincides with the corresponding engaging hole 36. The engaging projection 37 includes a shaft portion 37a and an anchoring portion 37b. The shaft portion 37a has an outer diameter that is generally the same as an inner diameter of the corresponding engaging hole 36. The anchoring portion 37b radially outwardly projects from the distal end of the shaft portion 37a. Each anchoring portion 37b is inserted through the corresponding engaging hole 36 and is anchored to the corresponding cover wall 22b, so that the fin member 13 is secured to the lever 12. It should be understood that this arrangement is equally applicable for securing between the fin member 13 and each gripper 24.

In the above embodiment, each fin portion 25 of the fin member 13 is provided with the three grippers 24, which are secured to the fin portion 25. However, only one of the two fin portions 25 can be provided with the grippers 24, which are secured to the fin portion 25, while the grippers 24 are eliminated from the other one of the fin portions 25. In this case, the grippers 25 may be provided in the rear end side fin portion 25, which moves smaller distance in comparison to the top end side fin portion 25 at the time of lifting the wiper arm 16 all the way apart from the wiping surface to its locked position. In this way, when the wiper arm 16 is lowered to the wiping surface 26, it is possible to limit unintentional detachment of the grippers 24 from the wiper strip 14, which would be caused by the shock applied thereto from the wiping surface 26 at the time of lowering the wiper arm 16.

In the above embodiment, the fin member 13 can be secured to the lever 12 and the grippers 24 by insert molding.

In the above embodiment, the holding portions 23 can be positioned at any desired points as long as each holding portion 23 is placed between the connecting arrangement 21 and the corresponding longitudinal end 14b, 14c of the wiper strip 14. The holding portions 23 can be symmetrically or asymmetrically arranged about the connecting arrangement 21.

In the above embodiment, the amount of extension of one of the arms 22 from the connecting arrangement 21 in the longitudinal direction of the wiper strip 14 can be the same as or different from that of the other one of the arms 22. That is, the lever 12 does not need to have the symmetrical structure about the connecting arrangement 21.

In the above embodiment, the wiper strip 14 is held by the holding portions 23 of the lever 12 at the connecting portion 28 of the wiper strip 14. Alternatively, a portion of each backing plate 15 can be exposed from the corresponding backing groove 28b in the transverse direction and can be held by the holding portions 23 of the lever 12. In this case, the wiper strip 14 is supported by the lever 12 through the backing plates 15.

In the above embodiment, the connecting arrangement 21, the arms 22 and the holding portions 23 of the lever 12 can be formed separately and can be joined together by, for example, welding.

In the above embodiment, the wiper strip 14 is made of the rubber material. However, the material of the wiper strip 14 is not limited to the rubber material. As long as the material (the elastic material) is elastically deformable, the material is not limited to the rubber material and can be any other appropriate material.

In the above embodiment, the fin member 13 is secured to the lever 12 in such a manner that the fin member 13 surrounds the lever 12. Alternatively, the fin member 13 can be eliminated to expose the lever 12.

For example, FIGS. 14-17 show an exemplary wiper blade 11a without the separate fin member 13. A lever 12a of the wiper blade 11a includes a connecting arrangement 21, two arms 22 and two holding portions 23. The connecting arrangement 21 is rotatably connected to the wiper arm 16. The arms 22 extend oppositely from the connecting arrangement 21 in the longitudinal direction of the wiper strip 14. The holding portions 23 are provided in distal ends of the arms 22, respectively. The wiper strip 14 is held together with the backing plates 15 by the holding portions 23. Even in this lever 12a, a space S is formed to extend in the top-bottom direction between the wiper strip 14 and the arms 22 as well as the connecting arrangement 21. The holding portions 23 are arranged at corresponding positions where the wiper strip 14 is divided into three sections, each of which has a generally equal length. Each arm 22 of the lever 12a has an inverted V-shaped cross section to have an opening in the lower side (the wiper strip 14 side) of the arm 22. The height of the arm 22 decreases toward the distal end of the arm 22, i.e., toward the corresponding holding portion 23. A fin portion 22c is integrally formed in each arm 22 on one lateral side of the arm 22 along the entire length of the arm 22. Each fin portion 22c has a sloped concave surface 22d, which is sloped relative to the wiping surface 26 to generate urging force for urging the wiper strip 14 against the wiping surface 26 when it receives wind, which is applied to the running vehicle. The lever 12a is formed through press working of a corresponding metal plate material. A resin cap 40 is installed to each of the longitudinal ends of the wiper strip 14 to prevent unintentional detachment of the backing plates 15 from the wiper strip 14.

Figure 17:
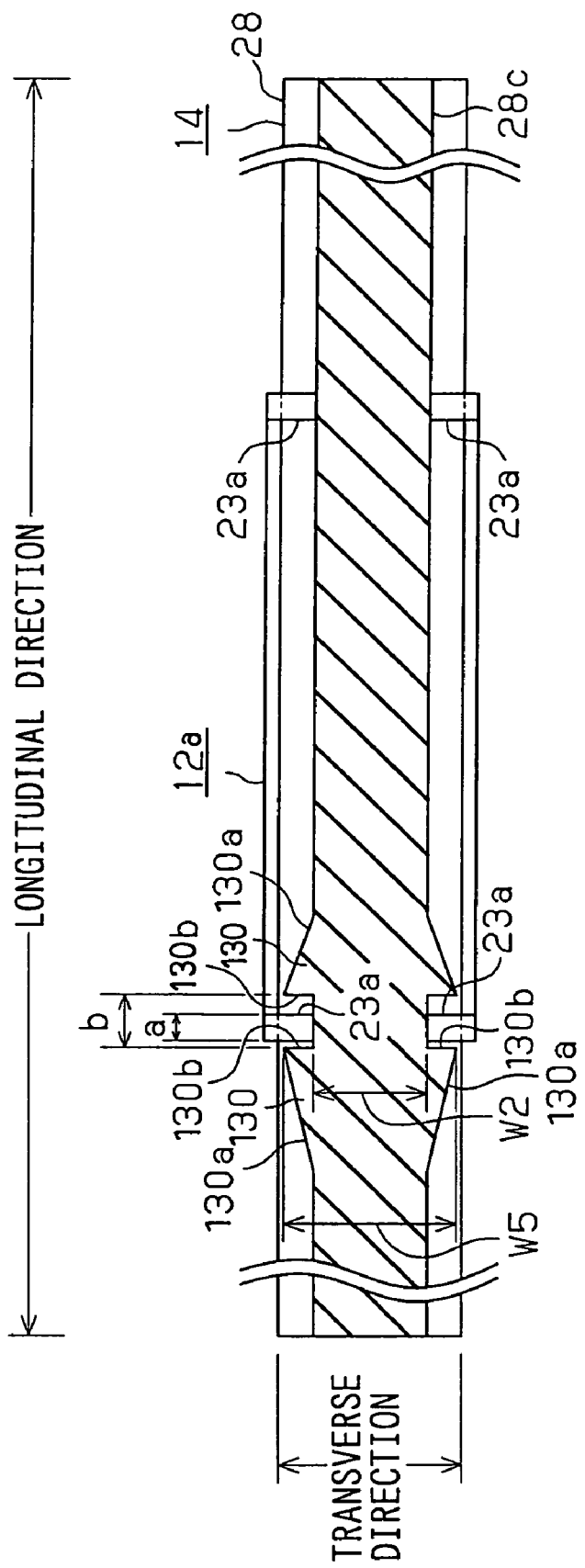
FIG. 17 is a cross sectional bottom view showing anchoring portions of a wiper strip of the wiper blade shown FIG. 14.
Figure 18:
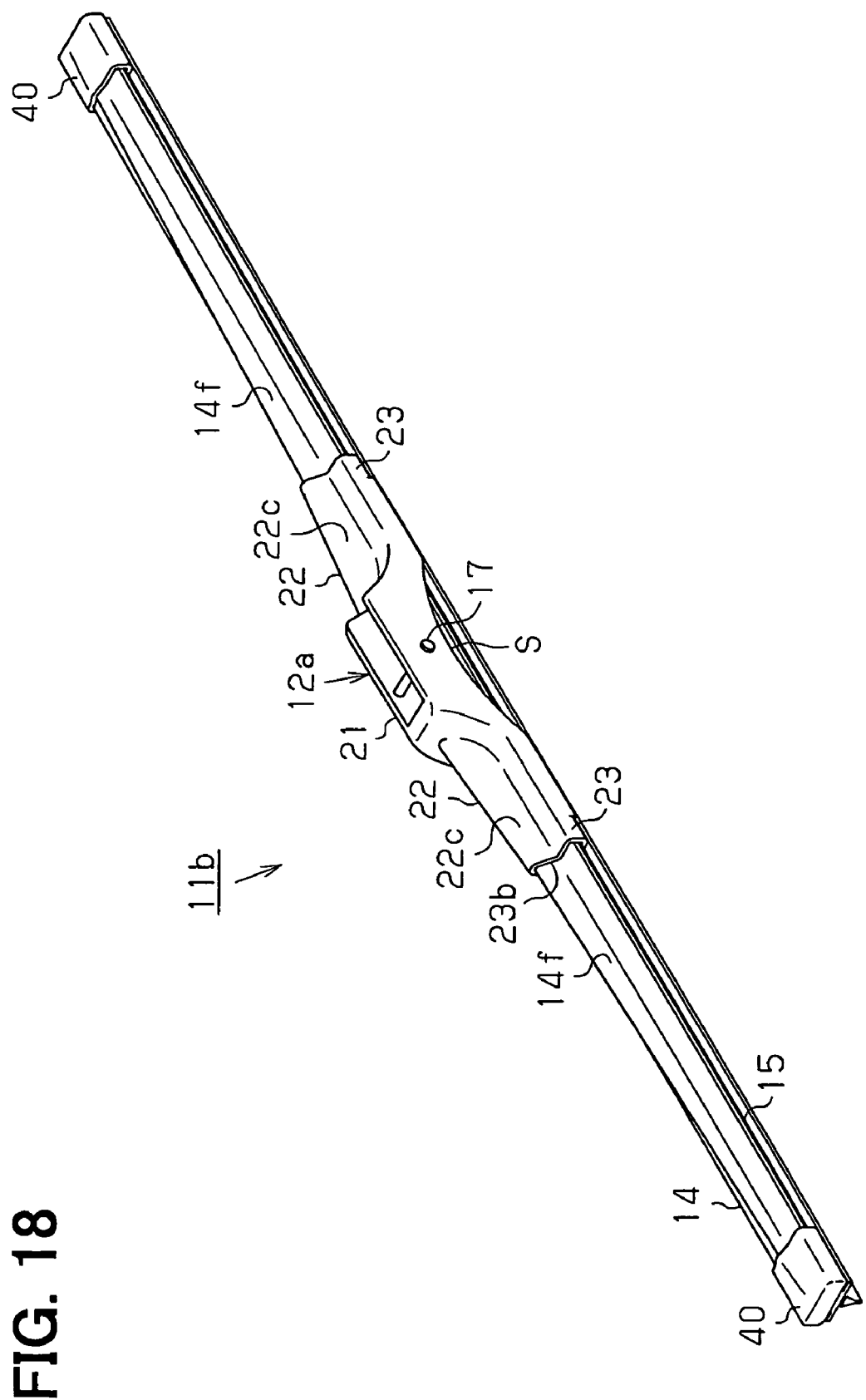
FIG. 18 is a perspective view showing a further modification of the wiper blade.
Figure 19:
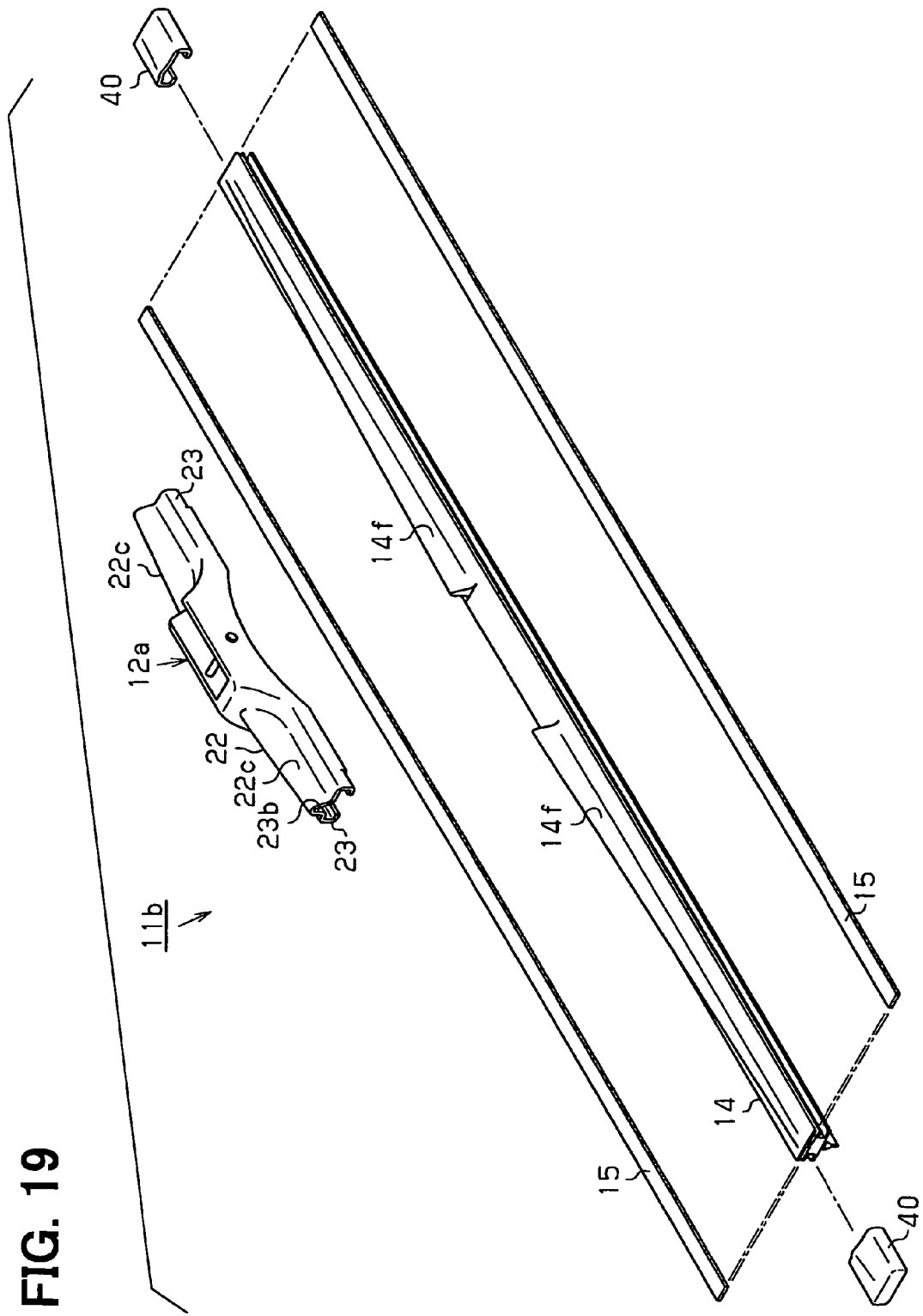
FIG. 19 is an exploded perspective view of the wiper blade shown in FIG. 18.
Figure 20A:
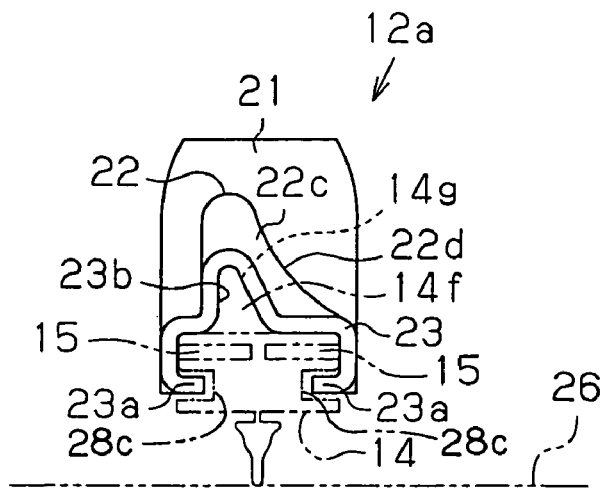
FIG. 20A is a cross sectional view of the wiper blade shown in FIG. 18.
Figure 20B:
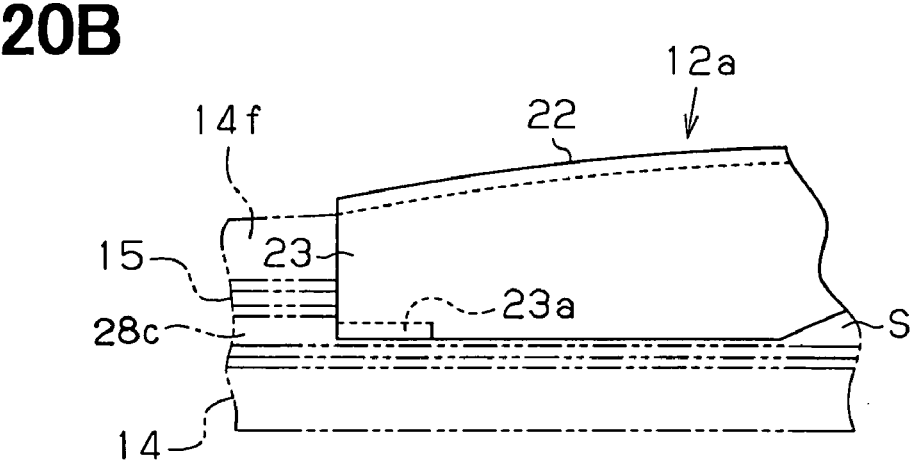
FIG. 20B is a partial front view showing the wiper blade shown in FIG. 18.
Figure 20C:
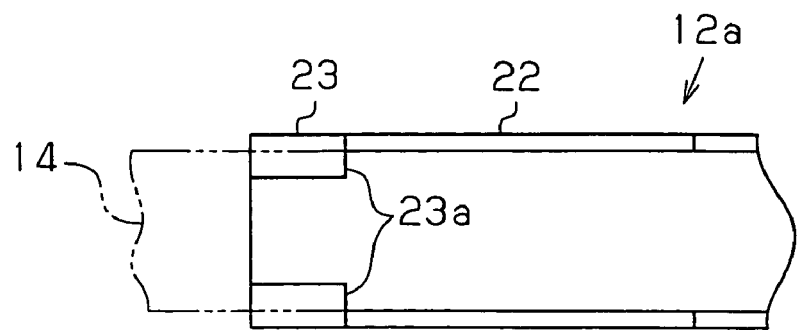
FIG. 20C is a partial bottom view showing the wiper blade shown in FIG. 18.

With reference to FIG. 17, in place of the anchoring portion 30 of the above embodiment, each holding groove 28c includes two anchoring portions 130. The anchoring portions 130 are provided on both lateral sides of one of the holding portions 23. A distance "b" between the anchoring portions 130 in the longitudinal direction of the wiper strip 14 (of the holding grooves 28c) is set to be larger than a longitudinal width "a" of the holding claw 23a of the holding portion 23 to provide a predetermined amount (i.e., b–a) of play.

With reference to FIG. 17, each anchoring portion 130 includes a sloped portion 130a, which gradually protrudes in the transverse direction toward the corresponding holding claw 23a. An end surface of the anchoring portion 13, which is opposed to the corresponding holding claw 23a, forms a limiting surface 130b, which extends in the transverse direction. Each limiting surface 30b limits longitudinal movement of the lever 12a (the holding claws 23a) away from the holding position of the wiper strip 14. A transverse width W5 of the wiper strip 14 at the limiting surfaces 130b of the anchoring portions 130 is set to be greater than the transverse width W2 between the opposed distal ends of the holding claws 23a of the holding portion 23 of the lever 12a. In this way, when the lever 12a is urged to move toward one of the longitudinal ends of the wiper strip 14, the lever 12a can move only the limited distance, which is equal to the amount (i.e., b–a) of play. Further movement of the lever 12a is limited when the holding portion 23 (the holding claws 23a) engages the corresponding anchoring portions 30, so that unintentional removal of the lever 12a from the wiper strip 14 is limited. At the time of placing the lever 12a in the holding position in the wiper strip 14, one of the longitudinal ends of the wiper strip 14 is installed to the lever 12a in such a manner that the holding claws 23a slide along the holding grooves 28c. At this time, the holding claws 23a elastically deform the anchoring portions 130 and move along the sloped portions 130a. Then, when the holding claws 23a pass the limiting surfaces 130b, each holding claw 23a is held between the longitudinally opposed limiting surfaces 130b to limit removal of the lever 12a from the wiper strip 14. It should be noted that the anchoring portions 130 can be provided in the above embodiment in addition to or alternative to the anchoring portions 30.

With the above modification, the fin portions 22c of the lever 12a receive the wind, which is applied to the running vehicle, and thereby reinforces the urging force of the wiper arm. Thus, the lever 12a alone can limit the lifting of the wiper strip 14. Furthermore, since the fin portions 22c are formed integrally with the lever 12a, the number of components of the wiper blade 11a can be minimized. Furthermore, each fin portion 22c is formed integrally in the corresponding arm 22, which extends from the connecting arrangement 21 in the longitudinal direction of the wiper strip 14. Thus, the fin portions 22c can be formed while the good appearance of the wiper blade 11a is maintained.

FIGS. 18-20C show another exemplary wiper blade 11b, which is a modification of the wiper blade 11a shown in FIGS. 14-17. Two fin portions 14f are integrally formed in the top surface, which is opposite from the wiping lip 29, of the wiper strip 14 of the wiper blade 11b. Each fin portion 14f includes a sloped concave surface 14g. The sloped concave surface 14g receives wind, which is applied to the running vehicle, and thereby generates the urging force for urging the wiper strip 14 against the wiping surface 26. Each fin portion 14f extends from a predetermined point, which is located longitudinally inward of the corresponding holding portion 23. The height of each fin portion 14f gradually decreases toward the longitudinal end of fin portion 14f. In response to the provision of the fin portions 14f in the wiper strip 14, a shape of a longitudinal distal end portion (the holding portion 23 side portion) of each arm 22 of the lever 12a is changed from that of the lever 12a discussed with reference to FIGS.

14-17, and thus an inner wall of each holding portion 23 is upwardly recessed to form a recessed portion 23b to correspond with the shape of the corresponding fin portion 14f. The longitudinal base end portion of each fin portion 14f of the wiper strip 14 is received in the recessed portion 23b of the corresponding holding portion 23. Thus, the generally continuous contour is provided from each arm 22 (each fin portion 22c) to the corresponding fin portion 14f of the wiper strip 14.

In this way, the fin portions 22c of the lever 12a and the fin portions 14f of the wiper strip 14 cooperate together to receive the wind, which is applied to the running vehicle, to increase the urging force for urging the wiper blade 11b against the wiping surface 26. Furthermore, the number of components of the wiper blade 11b is not increased.

In the lever 12a shown in FIGS. 14-20C, the fin 22c is formed in each arm 22. Alternatively, the fin can be formed in any other appropriate location in the lever 12a. For example, the fin can be provided on one lateral side of the connecting arrangement 21. Also, an extension can be formed in each arm 22 to extend from the arm 22 (the holding portion 23) toward the corresponding longitudinal end of the wiper strip 14, and the fin can be formed in the extension. Furthermore, these arrangements can be combined to form a fin portion.

Additional advantages and modifications will readily occur to those skilled in the art. The invention in its broader terms is therefore not limited to the specific details described above.

What is claimed is:

1. A wiper blade for a wiper system that wipes a wiping surface, the wiper blade comprising:
   a wiper strip that directly wipes the wiping surface, wherein the wiper strip includes at least one backing groove that extends in a longitudinal direction of the wiper strip;
   at least one backing plate that is made of a spring material having a predetermined rigidity and is received in a corresponding one of the at least one backing groove, wherein each of the at least one backing plate is convexly curved in a relaxed state in such a manner that a longitudinal center of the backing plate projects in a direction away from the wiping surface;
   a lever that includes:
   a connecting arrangement that is rotatably connected to a wiper arm of the wiper system; and
   first and second arms that are located on first and second longitudinal sides, respectively, of the connecting arrangement, wherein the first and second arms extend from the connecting arrangement toward first and second longitudinal ends, respectively, of the wiper strip in the longitudinal direction of the wiper strip;
   a fin member that is made of an elastic material and includes at least one sloped surface, which is sloped relative the wiping surface; and
   at least two retaining members, which are secured to the fin member to hold both the wiper strip and the at least one backing plate, wherein:
   each of the first and second arms includes a holding portion, which is provided in a longitudinal distal end of the arm to hold at least one of the wiper strip and the at least one backing plate;
   at least one of the at least two retaining members is located between the holding portion of the first arm and the first longitudinal end of the wiper strip, and at least another one of the at least two retaining members is located between the holding portion of the second arm and the second longitudinal end of the wiper strip;
   the fin member is secured to the lever and extends in the longitudinal direction of the wiper strip on both the first and second longitudinal sides of the connecting arrangement;
   the holding portion of the first arm is positioned in an intermediate location between the connecting arrangement and the first longitudinal end of the wiper strip;
   the holding portion of the second arm is positioned in an intermediate location between the connecting arrangement and the second longitudinal end of the wiper strip;
   the wiper strip includes:
   a wiping lip that directly wipes the wiping surface; and
   a connecting portion that is held by the holding portions of the first and second arms of the lever and is located on one side of the wiping lip, which is opposite from the wiping surface; and
   the fin member includes at least one receiving portion, which is recessed in the fin member in a direction away from the wiping lip and extends in the longitudinal direction of the wiper strip to receive at least a top side portion of the connecting portion of the wiper strip, which is opposite from the wiping lip; and
   each of the at least two retaining members is provided in a corresponding one of the at least one receiving portion of the fin member.

2. The wiper blade according to claim 1, wherein:
   the holding portion of each of the first and second arms holds the at least one of the wiper strip and the at least one backing plate in a slidable manner;
   the wiper strip includes first and second end follower sections, which substantially freely and elastically conform to the wiping surface;
   the first end follower section is located between the holding portion of the first arm and the first longitudinal end of the wiper strip; and
   the second end follower section is located between the holding portion of the second arm and the second longitudinal end of the wiper strip.

3. The wiper blade according to claim 1, wherein:
   the at least one sloped surface includes first and second sloped surfaces; and
   the fin member further includes:
   first and second fin portions, which are positioned on the first and second longitudinal sides, respectively, of the connecting arrangement of the lever and include the first and second sloped surfaces, respectively; and
   first and second cover portions, which connect between the first fin portion and the second fin portion and cover first and second lateral side surfaces, respectively, of the connecting arrangement.

4. The wiper blade according to claim 1, wherein:
   the at least one backing groove is formed in the connecting portion of the wiper strip;
   the connecting portion of the wiper strip further includes at least one holding groove that is arranged on one side of the at least one backing groove where the wiping lip is located; and
   the at least one holding groove extends in the longitudinal direction of the wiper strip and receives the holding portions of the first and second arms in such a manner that the holding portions of the first and second arms are slidable in the at least one holding groove in the longitudinal direction of the wiper strip.

5. The wiper blade according to claim 4, wherein the at least one holding groove of the connecting portion of the wiper strip further receives the at least two retaining members in such a manner that the at least two retaining members are slidable in the at least one holding groove in the longitudinal direction of the wiper strip.

6. The wiper blade according to claim 5, wherein:
the connecting portion of the wiper strip further includes an anchoring portion, which is located at a longitudinal end of the at least one holding groove; and
one of the at least two retaining members is anchored in the anchoring portion.

7. A wiper blade for a wiper system that wipes a wiping surface, the wiper blade comprising:
a wiper strip that directly wipes the wiping surface, wherein the wiper strip includes at least one backing groove that extends in a longitudinal direction of the wiper strip;
at least one backing plate that is made of a spring material having a predetermined rigidity and is received in a corresponding one of the at least one backing groove, wherein each of the at least one backing plate is convexly curved in a relaxed state in such a manner that a longitudinal center of the backing plate projects in a direction away from the wiping surface; and
a lever that includes:
a connecting arrangement that is rotatably connected to a wiper arm of the wiper system; and
first and second arms that are located on first and second longitudinal sides, respectively, of the connecting arrangement, wherein the first and second arms extend from the connecting arrangement toward first and second longitudinal ends, respectively, of the wiper strip in the longitudinal direction of the wiper strip, wherein:
each of the first and second arms includes a holding portion, which is provided in a longitudinal distal end of the arm to hold at least one of the wiper strip and the at least one backing plate;
the holding portion of the first arm is positioned in an intermediate location between the connecting arrangement and the first longitudinal end of the wiper strip and is slidable relative to said at least one of the wiper strip and the at least one backing plate;
the holding portion of the second arm is positioned in an intermediate location between the connecting arrangement and the second longitudinal end of the wiper strip and is anchored to the at least one of the wiper strip and the at least one backing plate to limit movement of the holding portion of the second arm relative to said at least one of the wiper strip and the at least one backing plate in the longitudinal direction of the wiper strip;
the lever is spaced away from a top surface of the wiper strip between the holding portion of the first arm and the holding portion of the second arm such that an accommodating space is created between the lever and the top surface of the wiper strip to accommodate a portion of the wiper strip when the wiper strip is flexed toward the lever;
the wiper strip includes first and second fin portions, which are formed integrally with the rest of the wiper strip and protrude from the top surface of the wiper strip in a direction away from the wiping surface;
each of the first and second fin portions of the wiper strip includes a sloped surface, which is sloped relative to the wiping surface;
the first fin portion of the wiper strip extends from the holding portion of the first arm toward the first longitudinal end of the wiper strip in the longitudinal direction such that a longitudinal extent of the first fin portion of the wiper strip does not overlap with a longitudinal extent of the accommodating space; and
the second fin portion of the wiper strip extends from the holding portion of the second arm toward the second longitudinal end of the wiper strip in the longitudinal direction such that a longitudinal extent of the second fin portion of the wiper strip does not overlap with the longitudinal extent of the accommodating space.

8. The wiper blade according to claim 7, wherein: the holding portion of the first arm is spaced generally one-third of an entire length of the wiper strip from the first longitudinal end of the wiper strip; and the holding portion of the second arm is spaced generally one-third of the entire length of the wiper strip from the second longitudinal end of the wiper strip.

9. The wiper blade according to claim 7, wherein the holding portion of each of the first and second arms is positioned along the wiper strip in such a manner that when the wiper blade swings along the wiping surface, the holding portion moves along a corresponding path in the wiping surface, wherein the corresponding path shows a relatively small change in surface curvature in comparison to the rest of the wiping surface.

10. The wiper blade according to claim 7, wherein the lever includes at least one fin portion, which is formed integrally therein, wherein each of the at least one fin portion of the lever includes a sloped surface, which is sloped relative to the wiping surface.

11. The wiper blade according to claim 10, wherein the at least one fin portion of the lever includes first and second fin portions, which are provided integrally in the first and second arms, respectively, of the lever.

12. The wiper blade according to claim 11, wherein each of the first and second arms includes:
first and second lateral walls, which extend continuously from the first and second walls, respectively, of the connecting arrangement in the longitudinal direction of the wiper strip; and
a cover wall that connects between the first and second lateral walls; and a portion of each of the first and second fin portions of the lever is formed integrally in the cover wall of a corresponding one of the first and second arms to provide the sloped surface.

13. The wiper blade according to claim 11, wherein the holding portion of each of the first and second arms includes a recessed portion, which receives a longitudinal base end portion of the corresponding one of the first and second fin portions of the wiper strip, so that the first and second fin portions of the first and second arms and the first and second fin portions of the wiper strip provide a continuous outer appearance.

14. The wiper blade according to claim 7, wherein:
the wiper strip includes first and second end follower sections, which substantially freely and elastically conform to the wiping surface;
the first end follower section is located between the holding portion of the first arm and the first longitudinal end of the wiper strip; and
the second end follower section is located between the holding portion of the second arm and the second longitudinal end of the wiper strip.

15. A wiper blade according to claim 7, wherein size of the accommodating space between the lever and the top surface of the wiper strip increases toward a longitudinal center of the accommodating space between the holding portion of the first arm and the holding portion of the second arm.

16. The wiper blade according to claim 15, wherein the size of the accommodating space between the lever and the top surface of the wiper strip is maximized at a longitudinal center area of the wiper strip, which is adjacent to a rotational shaft of the connecting arrangement.

* * * * *